US008305287B2

(12) United States Patent
Sabatino

(10) Patent No.: US 8,305,287 B2
(45) Date of Patent: Nov. 6, 2012

(54) METHOD AND APPARATUS FOR PROPPING DEVICES

(75) Inventor: Mark Sabatino, Jamesville, NY (US)

(73) Assignee: Saab Sensis Corporation, Wilmington, DE (US)

( * ) Notice: Subject to any disclaimer, the term of this patent is extended or adjusted under 35 U.S.C. 154(b) by 1668 days.

(21) Appl. No.: 11/573,652

(22) PCT Filed: Sep. 12, 2005

(86) PCT No.: PCT/US2005/032366

§ 371 (c)(1),
(2), (4) Date: Feb. 13, 2007

(87) PCT Pub. No.: WO2006/031708

PCT Pub. Date: Mar. 23, 2006

(65) Prior Publication Data

US 2007/0205338 A1 Sep. 6, 2007

Related U.S. Application Data

(60) Provisional application No. 60/609,191, filed on Sep. 10, 2004.

(51) Int. Cl.
*B60S 9/22* (2006.01)
*F16H 3/06* (2006.01)
*H01Q 1/10* (2006.01)
*H01Q 1/32* (2006.01)

(52) U.S. Cl. .................. 343/881; 280/764.1; 280/766.1; 74/89.32; 343/882; 343/883

(58) Field of Classification Search .................. 343/881, 343/882, 883; 280/763.1, 764.1, 765.1, 766.1; 248/122.1, 201, 299.1; 74/89.32
See application file for complete search history.

(56) References Cited

U.S. PATENT DOCUMENTS

| | | | | |
|---|---|---|---|---|
| 4,148,528 | A | 4/1979 | Channell | |
| 4,424,985 | A * | 1/1984 | Holmes | 280/766.1 |
| 4,815,757 | A * | 3/1989 | Hamilton | 280/764.1 |
| 4,913,458 | A * | 4/1990 | Hamilton | 280/6.153 |
| 4,932,176 | A * | 6/1990 | Roberts et al. | 52/118 |
| 5,166,696 | A | 11/1992 | Rupp et al. | |
| 5,929,817 | A | 7/1999 | Clark | |
| 6,630,912 | B2 | 10/2003 | Ehrenberg et al. | |
| 6,677,914 | B2 | 1/2004 | Mertel | |
| 6,788,551 | B2 | 9/2004 | Takagi | |
| 7,183,989 | B2 * | 2/2007 | Tietjen | 343/757 |
| 2002/0135532 | A1 | 9/2002 | Chiang | |
| 2006/0268518 | A1 | 11/2006 | Edward et al. | |

FOREIGN PATENT DOCUMENTS

WO 2006/031708 3/2006

* cited by examiner

*Primary Examiner* — Leonard R Leo
(74) *Attorney, Agent, or Firm* — Burr & Brown

(57) ABSTRACT

Apparatus for propping a device, comprising a platform, a bracket, a carriage and a backstay. The backstay is rotatable relative to the carriage and to the device. The carriage can be moved in a first direction, which can causes a device to move between a stowed position and a deployed position. Apparatus comprising a rotatable assembly and a device movable between stowed and deployed positions, a center of rotation of the device in the deployed position being at or displaced only substantially vertically from a center of gravity of the rotatable assembly. Apparatus comprising a platform mounting portion, a platform structure rotatably mounted thereon, a duct extending through the platform mounting portion and into a space within the platform structure, whereby fluid can be passed through the duct and into the enclosed space while the platform structure is rotating relative to the mounting portion. Methods of propping a device.

32 Claims, 21 Drawing Sheets

METHOD AND APPARATUS FOR PROPPING DEVICES

FIELD OF THE INVENTION

The present invention relates to apparatus for propping a device. The present invention also relates to an apparatus comprising a device which is movable between a stowed position and a deployed position. The present invention is further directed to an antenna system, e.g., a rotating radar antenna system, which is transportable on a vehicle. The present invention is further directed to methods of propping such devices. The present invention is further directed to apparatuses as described above which include components for facilitating cooling of one or more components, as well as methods for accomplishing such cooling.

BACKGROUND OF THE INVENTION

There are a wide variety of applications for which it is necessary to stably deploy a device in a propped orientation.

There are also a wide variety of applications for which it is necessary to move a device between a stowed position and a deployed position.

In addition, there are a wide variety of applications for which it is necessary to deploy a device in a propped position, and move the device between the propped position and a stowed position, and/or to transport the device from one location to another, and/or to rotate the device. For example, one such device is an antenna, a wide variety of which are well known to those skilled in the art. Specific examples of such antennas include radar antennas, such antennas being useful in avionics and for numerous other purposes. In many instances, it is advantageous to be able to move such an antenna from location to location.

There is an ongoing need for apparatus which more effectively satisfy the needs outlined above, and other related needs.

SUMMARY OF THE INVENTION

In a first aspect, the present invention is directed to an apparatus for propping a device, the apparatus comprising:

a platform;

at least a first bracket for slidably engaging a first portion of a device to be propped, the bracket being mounted on the platform;

at least one screw-threaded drive element, the drive element being rotatable about its longitudinal axis, the drive element having drive element threads on a surface thereof;

at least one rail mounted on the platform, the at least one rail extending in a direction substantially parallel to the longitudinal axis of the drive element, the at least one rail having a substantially uniform cross-sectional shape in planes substantially perpendicular to the longitudinal axis of the drive element;

a carriage having at least one rail engaging portion and at least one threaded portion, the rail engaging portion being of a shape which engages the rail, the threaded portion of the carriage having carriage threads which are in threaded engagement with the drive element threads, the carriage having at least one backstay mounting element;

a backstay, a first portion of the backstay being rotatably attached to the backstay mounting element such that the first portion of the backstay is free to rotate relative to the backstay mounting element about an axis which is substantially perpendicular to the longitudinal axis of the drive element, the backstay having a second portion for rotatably engaging a second portion of the device to be propped;

the drive element being rotatably supported by a drive element support and being threadedly supported by the threaded portion of the carriage, rotation of the drive element about its longitudinal axis causing the carriage to move in a direction substantially along the longitudinal axis due to the threaded engagement, which causes the first portion of the backstay to move relative to the bracket, which causes the second portion of the backstay to move relative to the bracket.

Preferably, the bracket comprises a ledge for slidably supporting the first portion of the device to be propped. Preferably, if a device to be propped is mounted on the apparatus with the first portion of the device slidably engaging the bracket and the second portion of the device rotatably engaging the second portion of the backstay, rotation of the drive element in a first rotational direction about its longitudinal axis causes the carriage to move from a first carriage position to a second carriage position, which causes the device to rotate about an axis perpendicular to the longitudinal axis, with the first portion of the device rotating relative to the bracket.

Preferably, the apparatus further comprises a support, the support comprising a platform mounting portion on which the platform is mounted, the platform being rotatable relative to the support.

In a second aspect, the present invention relates to an apparatus comprising:

a device, the device being movable between a stowed position and a deployed position;

a platform;

at least a first bracket slidably engaging a first portion of the device, the bracket being mounted on the platform;

at least one screw-threaded drive element, the drive element being rotatable about its longitudinal axis, the drive element having drive element threads on a thereof;

at least one rail mounted on the platform, the at least one rail extending in a direction substantially parallel to the longitudinal axis of the drive element, the at least one rail having a substantially uniform cross-sectional shape in planes substantially perpendicular to the longitudinal axis of the drive element;

a carriage having at least one rail engaging portion and at least one threaded portion, the rail engaging portion being of a shape which engages the rail, the threaded portion of the carriage having an axis which is substantially coaxial with the longitudinal axis of the drive element, the threaded portion of the carriage having carriage threads which are in threaded engagement with the drive element threads, the carriage having at least one backstay mounting element;

a backstay, a first portion of the backstay being rotatably attached to the backstay mounting element such that the first portion of the backstay is free to rotate relative to the backstay mounting element about an axis which is substantially perpendicular to the longitudinal axis of the drive element, the backstay having a second portion rotatably engaging a second portion of the device;

the drive element being rotatably supported by a drive element support and being threadedly supported by the threaded portion of the carriage, rotation of the drive element about its longitudinal axis causing the carriage to move in a direction substantially along the longitudinal axis due to the threaded engagement, which causes the first portion of the backstay to move relative to the bracket, which in turn causes the second portion of the backstay to move relative to the bracket, which in turn causes the device to move between the stowed position and the deployed position.

Preferably, rotation of the drive element in a first rotational direction about its longitudinal axis causes the carriage to move from a first carriage position to a second carriage position, which causes the device to rotate about an axis perpendicular to the longitudinal axis, with the first portion of the device rotating relative to the bracket, to move to the deployed position.

Preferably, the apparatus according to this aspect of the invention further comprises a support, the support comprising a platform mounting portion on which the platform is mounted, the platform being rotatable relative to the support.

Preferably, the device is a sensor. Preferably, the device is a radar antenna.

Preferably, the support has a plurality of adjustable stands which can be adjusted to make the platform mounting portion substantially level.

Preferably, a first plane defined by any three points of the device when in the stowed position and a second plane defined by the three points of the device when in the deployed position are offset from being substantially parallel to each other by only rotation about an axis which is perpendicular to the longitudinal axis of the drive element. Preferably, the three points of the device are in the first plane when the device is in the intermediate position.

Preferably, a center of gravity of the device when in the deployed position is displaced from a center of gravity of the device when in the stowed position only substantially vertically.

Preferably, a center of gravity of the device, when the device is in the stowed position, lies along an axis of rotation of the device relative to the support, when the device is in the deployed position.

Preferably, the device, when in the stowed position, does not extend beyond the platform in either direction along the longitudinal axis of the drive element.

In one specific aspect, the present invention provide a rotating antenna system that can be quickly set up for operation in the field.

In another specific aspect, the present invention provides a vehicle transportable rotating antenna system which can be operated with or without the transporting vehicle positioned beneath the platform.

In another specific aspect, the present invention provides a highly compact elevation drive system utilizing a drive element that is self cleaning and self lubricating to withstand operation under various environmental conditions.

In another specific aspect, the present invention provides a rotating antenna platform which can be quickly converted from being on a transporting vehicle to being free standing on any of a variety of terrains.

The invention may be more fully understood with reference to the accompanying drawings and the following detailed description of the invention.

DETAILED DESCRIPTION OF THE INVENTION

FIGS. 1-22 depict a first embodiment of an apparatus in accordance with the present invention. In the discussion of the first embodiment set forth below, various details are provided, e.g., dimensions of components, etc., which apply to this embodiment but which are not required in accordance with the present invention. That is, the first embodiment (as well as the second embodiment) is a representative example of an apparatus which falls within the scope of the present invention.

Figure 1:
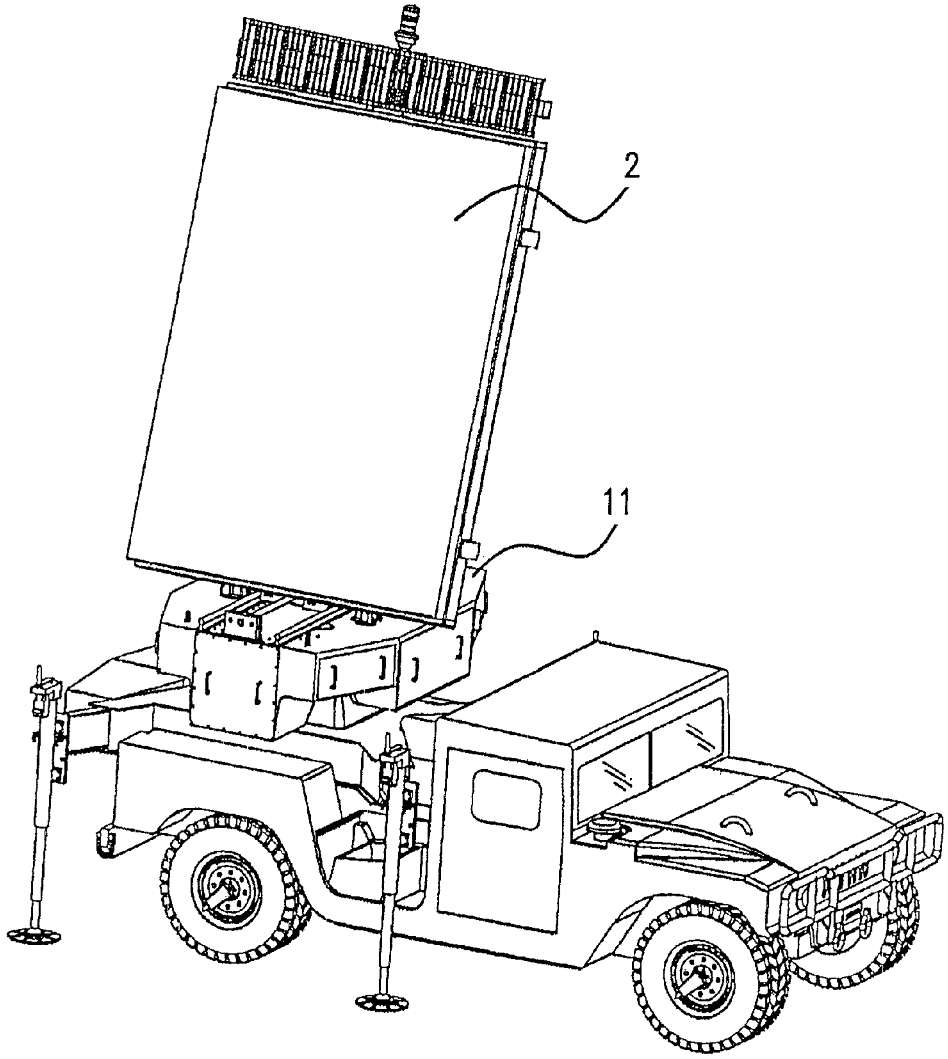
FIG. 1 is a perspective view of a first embodiment of an apparatus according to the present invention, the apparatus being a vehicle portable self contained rotating antenna operating system with the antenna in a deployed orientation, the apparatus being on a vehicle.
Figure 2:
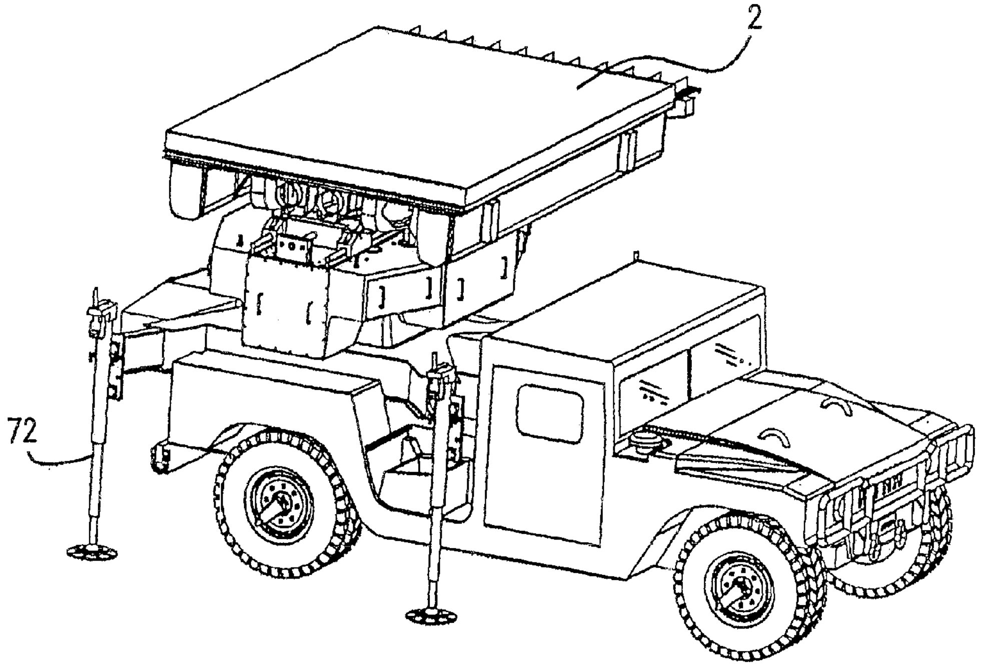
FIG. 2 is a perspective view of the first embodiment with the antenna in a stowed orientation, the apparatus being on a vehicle.

The apparatus of the first embodiment is a rotatable radar antenna which can be transported by a vehicle (e.g., on a truck or in an airplane), i.e., the apparatus is a "vehicle portable rotatable antenna system." FIG. 1 depicts the first embodiment of a vehicle portable rotatable antenna system in a deployed configuration mounted on the rear cargo deck of a truck. FIG. 2 depicts the first embodiment of a vehicle portable rotatable antenna system in a stowed configuration mounted on the rear cargo deck of a truck.

As discussed herein, FIGS. 3-16 each depict one or more components of the first embodiment—in each of FIGS. 3-16, various components are not depicted in order to permit the features being described to be seen. Many of the Figures depict only one or several of the many components in the first embodiment.

Figure 3:
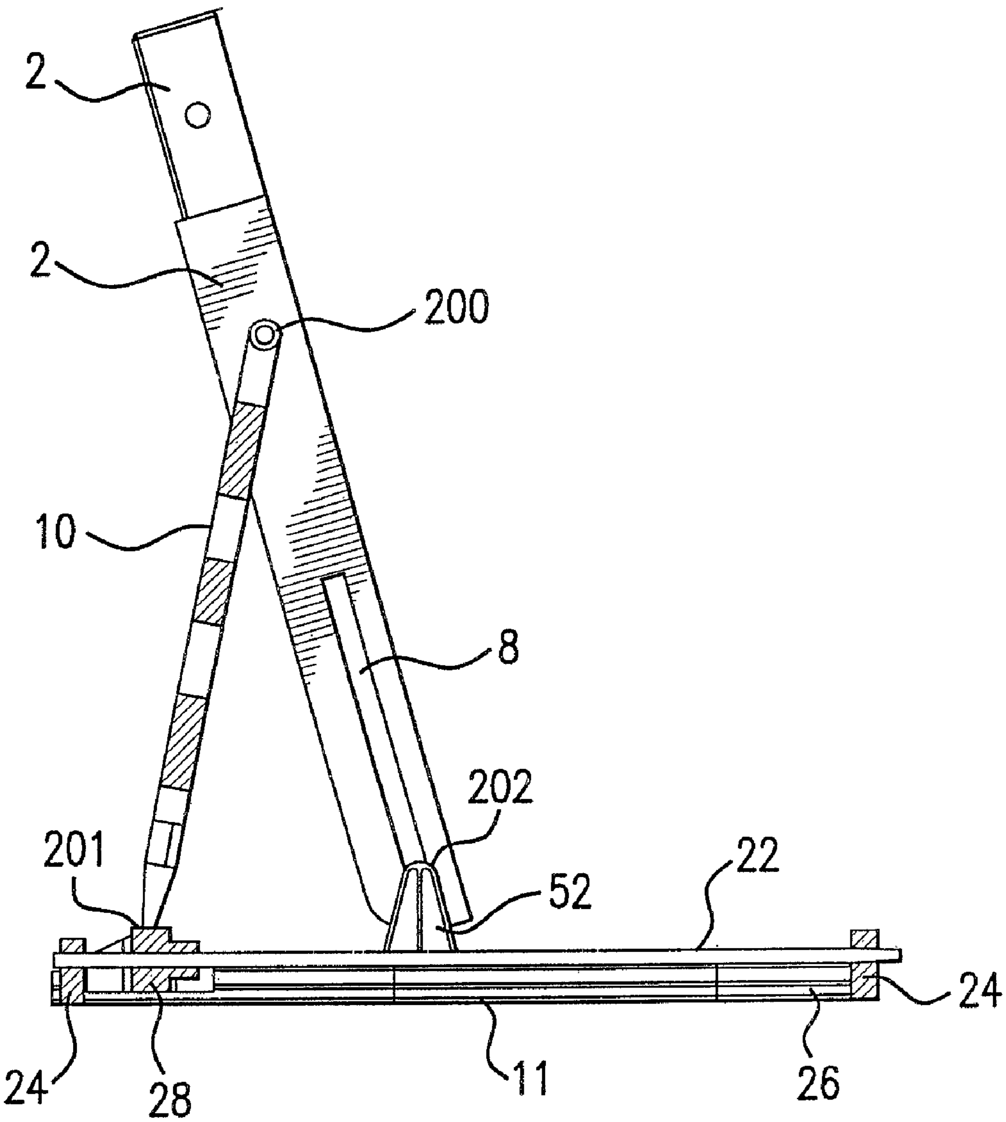
FIG. 3 is a schematic representation of some of the elements contained in the first embodiment, in a deployed orientation.
Figure 4:
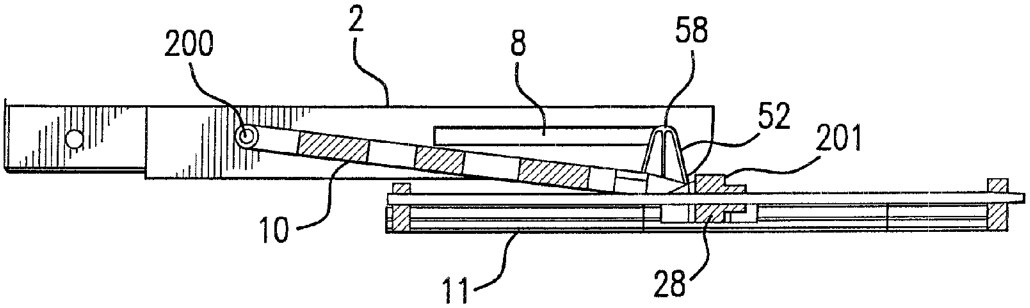
FIG. 4 is a schematic representation of some of the elements contained in the first embodiment, in an intermediate orientation.
Figure 5:
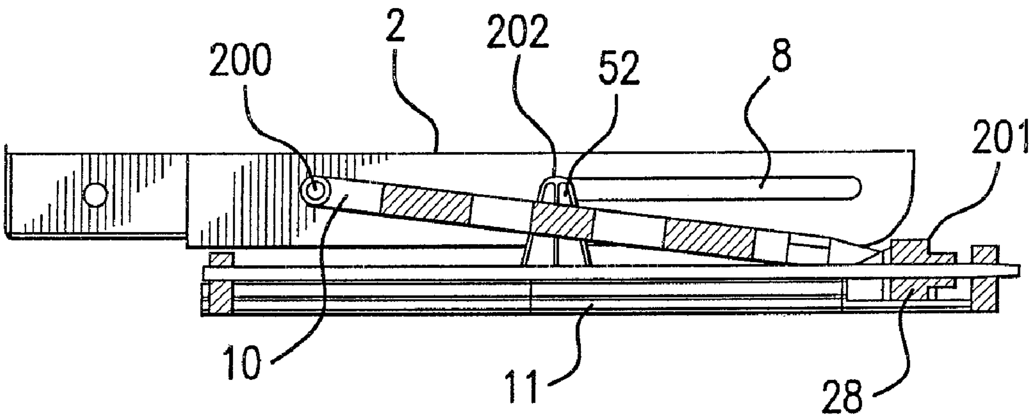
FIG. 5 is a schematic representation of some of the elements contained in the first embodiment, in a stowed orientation.

FIGS. 3, 4 and 5 are schematic representations of some of the elements contained in the first embodiment, in a deployed orientation (FIG. 3), an intermediate orientation (FIG. 4) and a stowed orientation (FIG. 5). FIG. 3 is a sectional view along a vertical plane substantially aligned with the rear axle of the vehicle depicted in FIG. 1, showing the antenna 2, one of the slots 8, the backstay 10, one rail 26, the carriage 28, one bracket 52, the drive element 22 and the end supports 24. FIG. 4 is a sectional view which is similar to that of FIG. 3, except that the apparatus has been moved from the deployed orientation to the intermediate orientation. FIG. 5 is a sectional view which is similar to that of FIG. 4, except that the apparatus has been moved from the intermediate orientation to the stowed orientation.

As discussed in more detail below, the carriage 28 is movable (to the right and to the left as viewed in FIGS. 3-5) along the rails 26 (as noted above, only one of the rails is visible in FIGS. 3-5) and the brackets 52 (only one being visible in FIGS. 3-5) are rigidly attached to the platform 11. An upper portion (as viewed in FIG. 3) of the backstay 10 is rotatable relative to an upper portion (again as viewed in FIG. 3) of the antenna 2 about a pivot axis 200 extending perpendicular to the plane of the page. A lower portion (as viewed in FIG. 3) of the backstay 10 is rotatable relative to the carriage 28 about a pivot axis 201 extending perpendicular to the plane of the page. The slots 8 (only one being visible in FIG. 3) on the lower portion (as viewed in FIG. 3) of the antenna 2 accommodate protrusions 58 on the brackets 52 (see FIG. 7), such that the lower portion of the antenna 2 is rotatable relative to the protrusions 58 about a pivot axis 202 extending through the protrusions perpendicular to the plane of the page.

Figure 6:
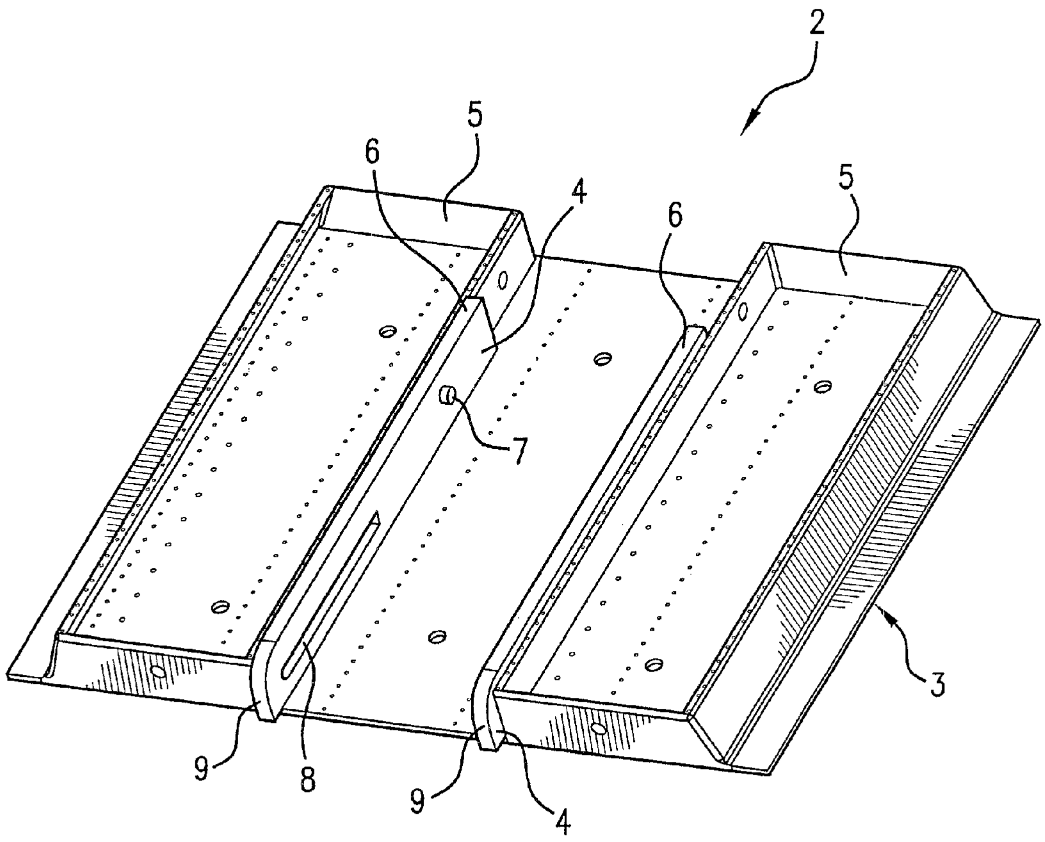
FIG. 6 is a perspective view of the rear side of the antenna of the first embodiment according to the present invention.
Figure 7:
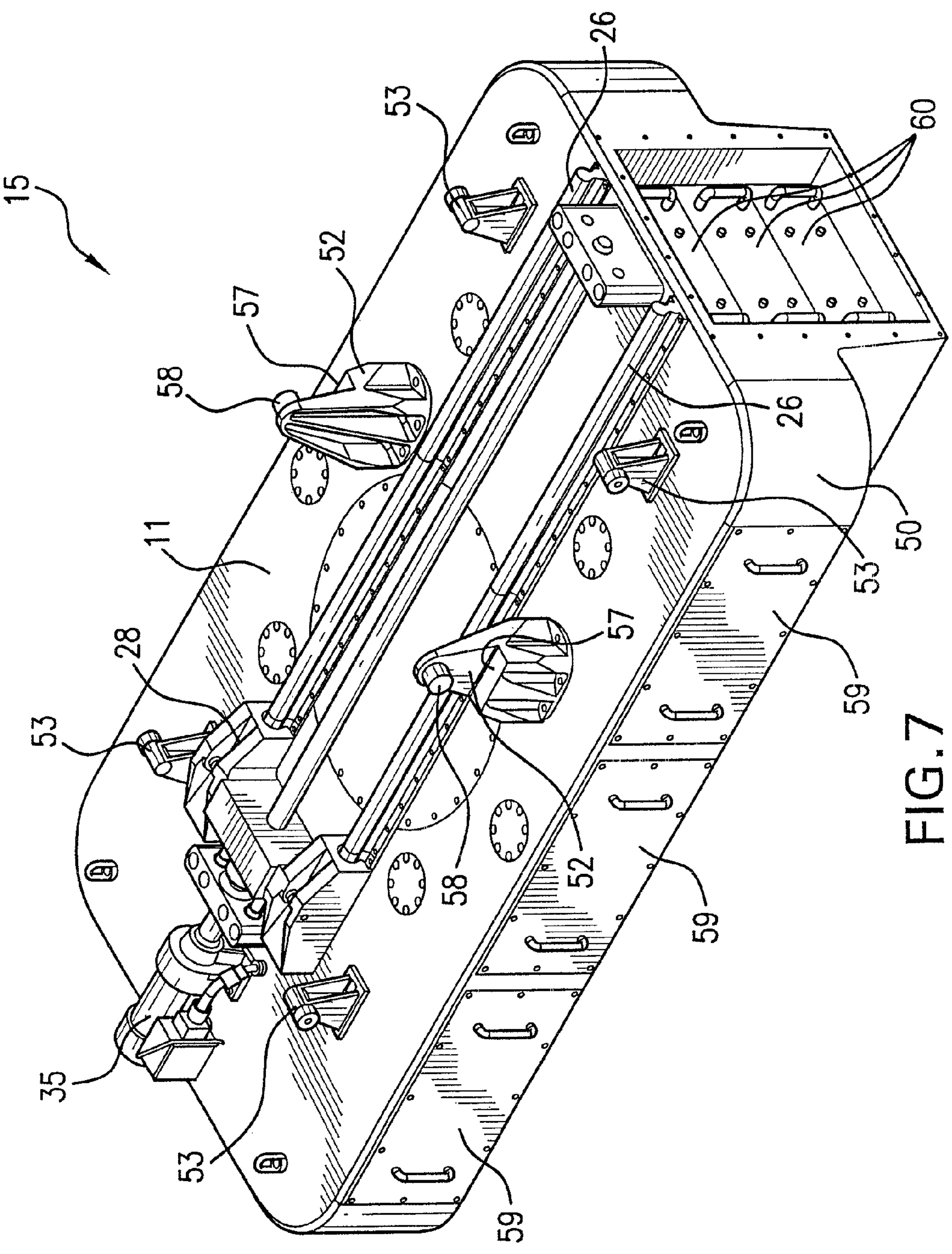
FIG. 7 is a perspective view of an antenna mounting structural platform contained in the first embodiment according to the present invention.

When in the deployed orientation (FIG. 3), the protective strips 9 and 6 (see FIG. 6) mounted on the lower edge (as viewed in FIG. 3) of the antenna 2 are slidably supported on ledges 57 on the brackets 52 (see FIG. 7).

In order to move from the deployed orientation (FIG. 3) to the intermediate orientation (FIG. 4), the drive element 22 (which is screw-threaded through a drive element nut 23 which is attached to the carriage 28) is rotated to cause the carriage 28 to move to the right (as viewed in FIG. 3), causing the backstay 10 and the antenna 2 to rotate about the respective axes 200, 201 and 202 and reach the orientation shown in FIG. 4 (to move from the intermediate orientation to the deployed orientation, the reverse is carried out). In order to move from the intermediate orientation (FIG. 4) to the stowed orientation (FIG. 5), the drive element 22 is rotated to cause the carriage 28 to move further to the right, causing the backstay 10 and the antenna to move to the right, with the protrusions 58 sliding within the slots 8, and the protective strips 9 and 6 (see FIG. 6) of the antenna 2 sliding along the ledge 57 on the bracket 52 (in order to move from the stowed orientation to the intermediate orientation, the reverse is carried out). References to upper and lower in the following discussion of the first embodiment are with respect to the orientation as shown in FIG. 3 (i.e., in the "deployed" position).

Referring to FIG. 6, the antenna 2 comprises an antenna structure 3, antenna electronics/equipment bay walls 5, slide supports 4, solid pins 7, slots 8 and protective strips 9 and 6. As depicted in FIG. 6, protective strips 9 and 6 are mounted on each of the slide supports 4, and a slot 8 is formed in each of the slide supports 4 (only one of the slots 8 is visible in FIG. 6). The antenna structure 3 is preferably constructed from a molded structural carbon composite material. On the side of the antenna on the side opposite that depicted in FIG. 6 are positioned conventional antenna array elements. The antenna electronics/equipment bay walls 5 are preferably constructed from a molded structural carbon composite material. The protective strips 6 are preferably constructed from a low coefficient of friction composite bearing material (e.g., "WEARCOMP®"), and they help to avoid damage to the slide supports 4 and the antenna 2 during antenna re-positioning operations and transport operations. The solid pins 7 rotatably connect the upper (i.e., upper when in the orientation shown in FIG. 3) portion of the antenna 2 to the backstay 10. The slots 8, which are located along an interior edge of each of the slide supports 4, are preferably constructed from solid fiberglass.

FIG. 7 depicts an antenna mounting structure 15. A pair of brackets 52 are rigidly mounted on a platform 11, each bracket 52 including an integral ledge 57 and an integral protrusion 58. The brackets 52, ledges 57 and protrusions 58 are preferably formed of stainless steel. The slots 8 on the antenna 2 accommodate the protrusions 58 on the respective brackets 52.

The protective strips 9 interface directly with the ledges 57 of the brackets 52 at the antenna positions shown in FIG. 3 and FIG. 4 (and between those positions). The protective strips 9 preferably are constructed from a high strength lightweight, low coefficient of friction load bearing material (e.g., copper-nickel-tin composite material) to transfer wind and weather induced loads imposed on the antenna in the deployed position upon brackets 52.

Figure 8:
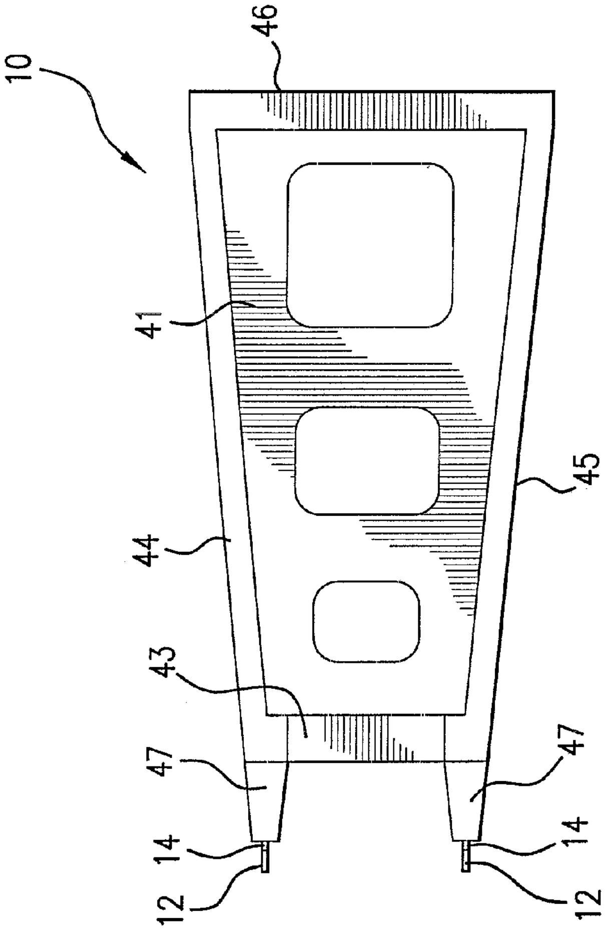
FIG. 8 is a top view of the backstay of the first embodiment according to the present invention.
Figure 9:
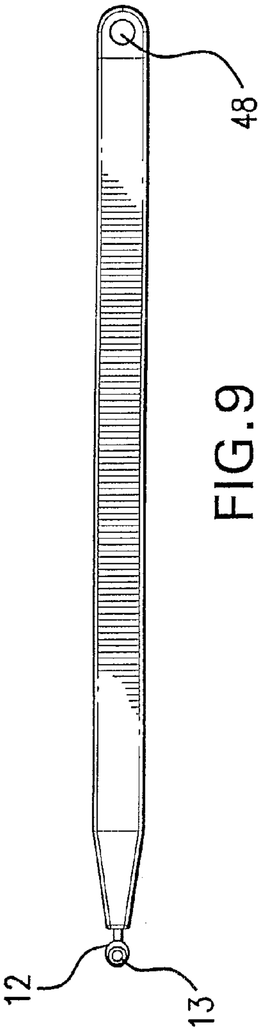
FIG. 9 is a front view of the backstay of the first embodiment according to the present invention.
Figure 10:
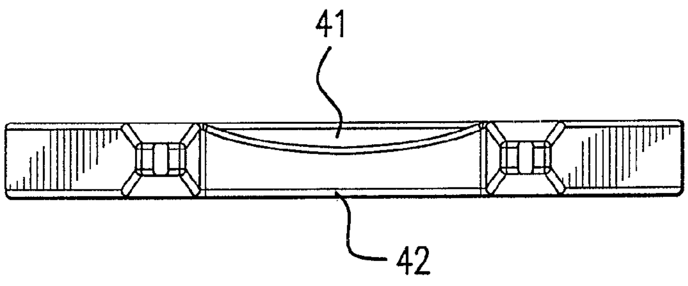
FIG. 10 is a side view of the backstay of the first embodiment according to the present invention.

Referring to FIGS. 8, 9 and 10, multiple views of the backstay 10 are depicted. The backstay 10 is preferably made of lightweight, carbon-epoxy composite material. The backstay 10 of this embodiment comprises a pair of rod ends 12, each of which has a rod end hole 13 and a rod end lock nut 14. The backstay 10 provides both angular location and structural support for the antenna 2 when it is in any orientation, including when it is deployed and rotating.

Referring to FIG. 8, in this embodiment, the backstay 10 has a top side 41, a bottom side 42 (see FIG. 10), a lower edge 43, a left side edge 44, a right side edge 45, and an upper edge 46. The backstay 10 in this embodiment also has two tapered rod end supports 47 and a concave center section (see FIG. 10). To minimize the overall structural weight while supporting the antenna under compression load (e.g., up to greater than 12,000 lbs and extension loads of up to greater than 6,000 lbs) during antenna elevation operations during operational use, the backstay 10 of this embodiment is tapered from a maximum width of about 28 inches at the upper edge 46 to a maximum of about 17 inches at the lower edge 43.

The upper edge 46 of the backstay 10 of this embodiment has a maximum thickness of about 3 inches. The upper edge 46 of the backstay 10 also has a hole 48 which receives the solid pins 7 of the antenna 2, which rotatably connect the upper portion of the antenna 2 to the upper edge 46 of the backstay 10. The left and right edges 44 and 45 of the backstay of this embodiment each have a maximum thickness of about 3 inches.

The lower edge 43 of the backstay 10 of this embodiment has a maximum thickness of about 3 inches. The two tapered rod end supports 47 project from left and right ends of the lower edge 43 of the backstay 10. The tapered rod end supports 47 extend from the lower edge 43 for a length of about 6 inches with a maximum thickness of about 3 inches at the lower edge 43 and are tapered at an angle of about 8 degrees on each side. Attached to each of the rod end supports 47 is a rod end 12. Each of the rod end holes 13 accommodates a rod end pivot pin 31 (see FIGS. 11 and 12) mounted on the carriage 28 in order to provide a rotational connection between the backstay 10 and the carriage 28 (discussed in more detail below). The rod end holes 13 preferably contain bearings to interface with the pivot pins 31.

The rod ends 12 of this embodiment extend from the lower edge of the rod end supports 47 for at least about 1.6 inches to the center of the bearing, with a lateral distance of about 15 inches between the rod ends 12.

The length that the rod ends 12 project from the tapered rod end supports 47 preferably can be adjusted (e.g., up to about ¼ inch or more) by turning the rod end bearing lock nuts 14. This makes it possible to adjust the overall length of the backstay 10 to facilitate optimum system operation, i.e., to make adjustment in order to provide the precise desired angles between the backstay 10 and the antenna 2.

Figure 11:
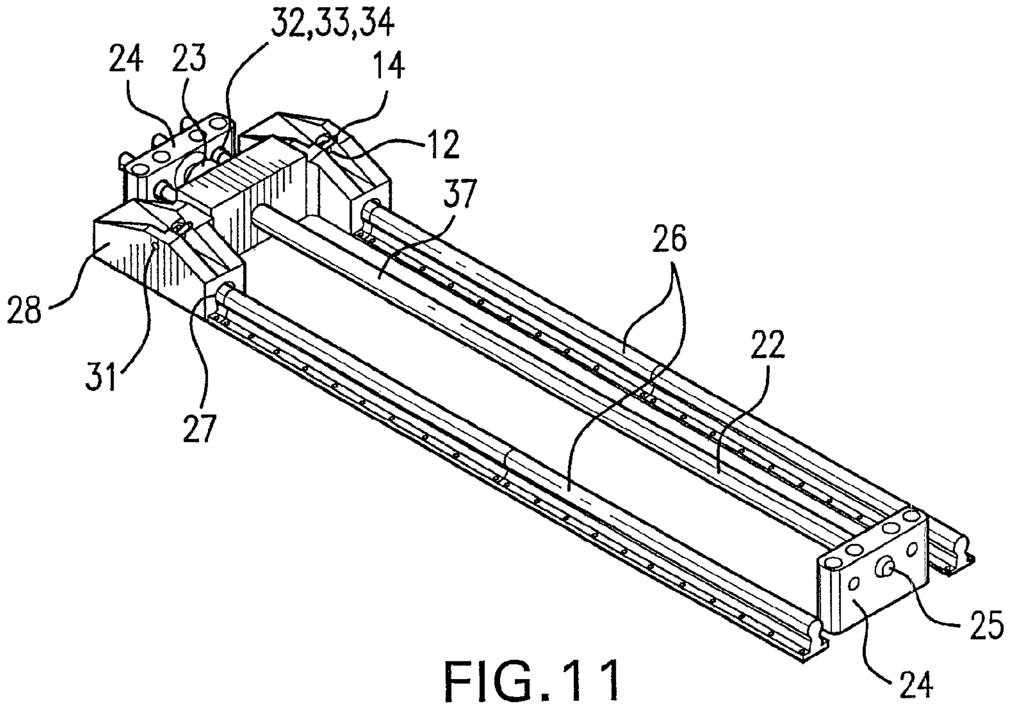
FIG. 11 is a perspective view of some of the elements contained in the first embodiment according to the present invention.

As shown in FIG. 7, a pair of rails 26 are rigidly mounted on the platform 11 on a surface of an equipment cabinet 50, parallel to each other and spaced to interface with rail engaging portions 36 (see FIG. 12) of the carriage 28. In this embodiment, the rails are spaced about 15 inches apart. Referring to FIG. 11, the rails 26 are preferably standard pacific bearing feather rails modified to permit multiple sections to be mounted to each other to meet the overall required length while maintaining the required centerline, concentricity and alignment. The rails are preferably made of aluminum.

Referring to FIG. 11, the apparatus further comprises a drive element 22 rotatably mounted at opposite ends in a pair of drive element end supports 24. A drive element end support is depicted in FIG. 13. On one end (the left end in FIG. 11), the drive element 22 extends through the end support 24 and is attached to a motor 35 (see FIG. 7). The drive element end supports 24 are rigidly attached to the platform 11. The drive element end supports 24 preferably have radial bearings and thrust washers 25 which facilitate free rotation of the drive element 22 about its axis without movement of the drive element 22 along its axis. The drive element 22 extends through a hole extending through the carriage 28 as shown in FIG. 11. The drive element 22 has external threads 37 which are threadedly engaged with internal threads on a drive element nut 23 which is attached to the carriage 28. The drive element nut 23 therefore causes the carriage 28 to move laterally in one direction along the axis of the drive element 22 when the drive element 22 is rotated clockwise and to move laterally in the opposite direction along the axis of the drive element 22 when the drive element is rotated counter-clockwise. Additionally, the drive element 22/drive element nut 23 combination is preferably selected so as to be self-cleaning and self-lubricating, such arrangements being well known in the art. The rail engaging portions 36 (see FIG. 12), which are preferably lined with linear bearings 27, engage the rails 26.

The drive element 22 (see FIG. 11), drive element nut 23, and drive element end supports 24 preferably comprise materials capable of withstanding maximum compression and tensile loads of greater than 12,000 lbs in operation and maximum static compression and tensile loads of greater than 1,600 lbs when not operating. The drive element 22 has two ends with the screw threading running along the longitudinal axis preferably with a nominal diameter of about 1.5 inches and preferably comprises a hard chrome surfaced heat treated alloy steel. The drive element preferably is oriented horizontally and has a stroke of at least about 61 inches.

The drive element nut 23 is preferably formed of an anodized aluminum shell with cast polymatrix threads. The cast polymatrix material is very hard and self-lubricating, which provides extended operational life.

The drive element end supports 24 preferably comprise an anodized aluminum casting. The drive element radial bearings and thrust washers 25 preferably comprise oil impregnated bronze material and the drive element radial bearings are preferably flanged. Two flanged drive element radial bearings are preferably mounted opposing each other in each of the drive element end supports 24, with thrust washers mounted against the flange faces of each drive element radial bearing. The drive element radial bearings and thrust washers 25 are sized to rotatably support the drive element at both ends, permitting the drive element 22 to rotate freely about its longitudinal axis while not moving along that axis.

The linear bearings 27 of the carriage 28 preferably comprise Teflon lined bearings in a stainless steel shell housing. The rails 26 and linear bearings 27 are preferably capable of withstanding maximum dynamic operational loads from greater than 2300 lbs to greater than −3100 lbs along the Y axis, and non-operational static loads from greater than 830 lbs to greater than −1450 lbs along the Y axis. The linear bearings 27 are housed in the carriage 28 and interface the carriage 28 to the rails 26.

Figure 12:
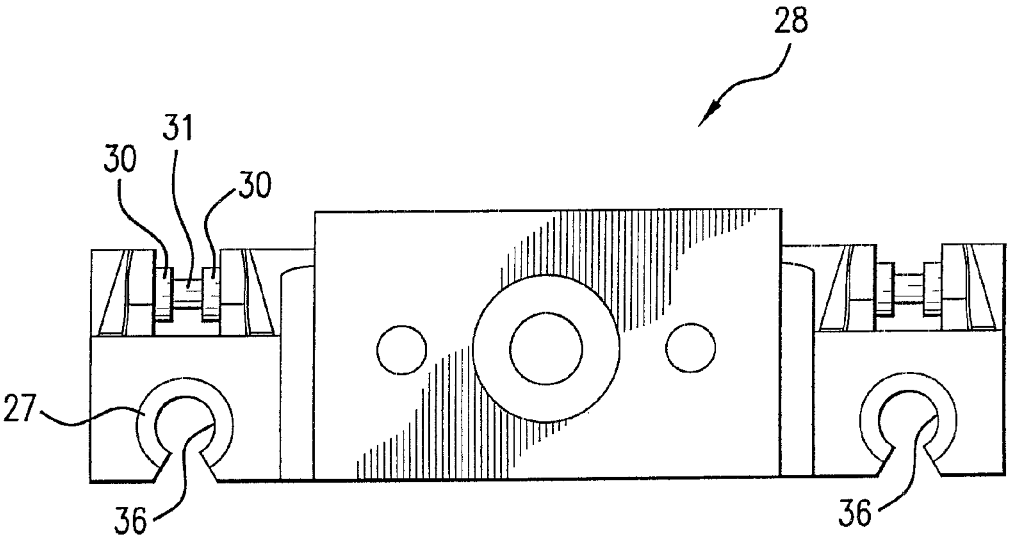
FIG. 12 is a front view of a carriage of the first embodiment according to the present invention.
Figure 13:
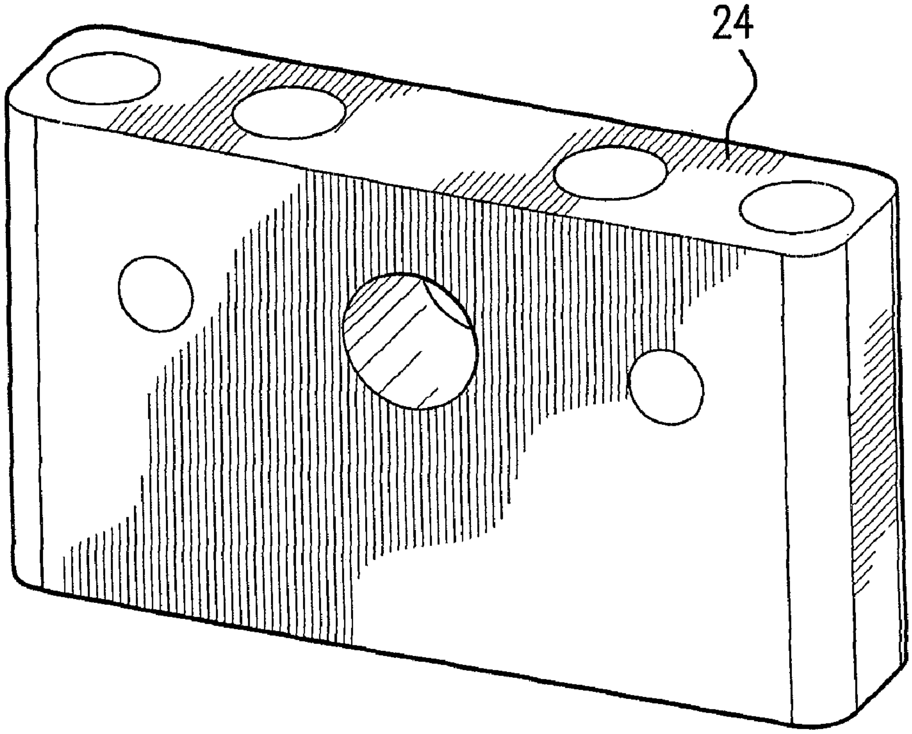
FIG. 13 is a perspective view of a drive element end support in the first embodiment according to the present invention.

Referring to FIG. 12, the carriage 28 has three sections, right, center and left, and preferably comprises anodized aluminum. The carriage 28 does not require any external lubrication. The lower portion of the right and left sections of the carriage 28 house the linear bearings 27.

The rod ends 12 of the backstay 10 (described above) are connected to the upper portions of the right and left sections of the carriage 28, respectively, preferably directly above the rails 26, by the rod end pivot pins 31, which extend through the rod end holes 13.

Also preferably mounted on the rod end pivot pins 31 are rod end thrust washers 30, shown in FIG. 12. The rod end thrust washers 30 preferably comprise oil impregnated bronze material. The rod end thrust washers 30 are preferably mounted one on either side of each of the rod ends 12 to position the rod ends 12 within the interface dimensional tolerance requirements. The rod end thrust washers 30 also aid in distributing side loads from the rod ends 12 to the carriage 28.

The drive motor 35 (see FIG. 7) comprises an encoder and a variable speed servo motor of sufficient capacity to overcome the force loads associated with raising and lowering the antenna 2 in winds of up to greater than 90 mph. Operation of the drive motor 35 causes the drive element 22 to rotate, which causes the drive element nut 23 (and therefore also the carriage 28) to move laterally relative to the drive element 22 and along the rails 26. The drive motor 35 preferably imparts to the drive element 22 a rotation rate of up to about 60 revolutions per minute (RPM), which preferably imparts to the carriage a variable linear travel rate from 5 to 15 inches per minute.

Four roller supports 53 are rigidly mounted on the platform 11 (see FIG. 7). The roller supports 53 interface with the slide supports 4 of the antenna 2 (and optionally also the protective strips 9 and 6) to provide lateral support for the stowed antenna 2 during transit and to facilitate the lateral displacement of the antenna 2 during deployment to and from the deployed position, that is, when the antenna 2 is in the stowed position, when the antenna 2 is in the intermediate position, and when the antenna 2 is between the stowed position and the intermediate position (i.e., when the antenna is being moved from the stowed position to the intermediate position or from the intermediate position to the stowed position).

Referring to FIG. 7, the equipment cabinet 50 provides environmental protection and structural support for the vehicle portable rotatable antenna system. The equipment cabinet 50 is constructed to withstand the maximum loads expected to be encountered.

The equipment cabinet 50 preferably includes equipment bays 59 and vertically stacked bays 60, each bay including a door.

Figure 14:
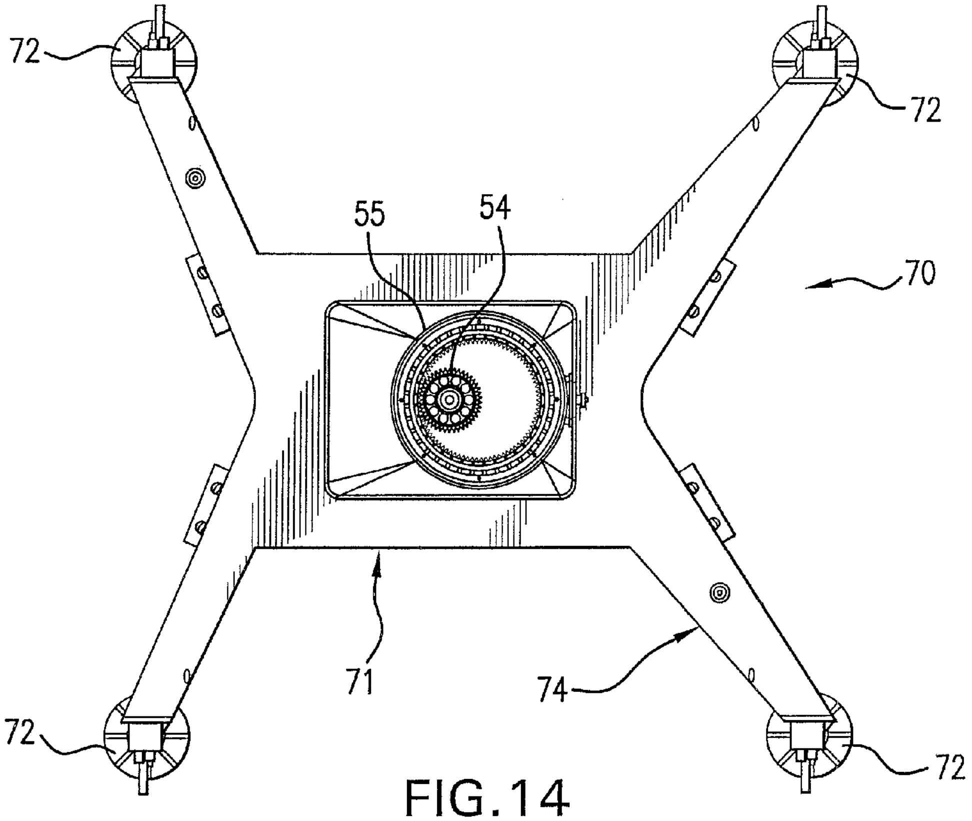
FIG. 14 is a top view of some of the elements in the first embodiment according to the present invention.
Figure 15:
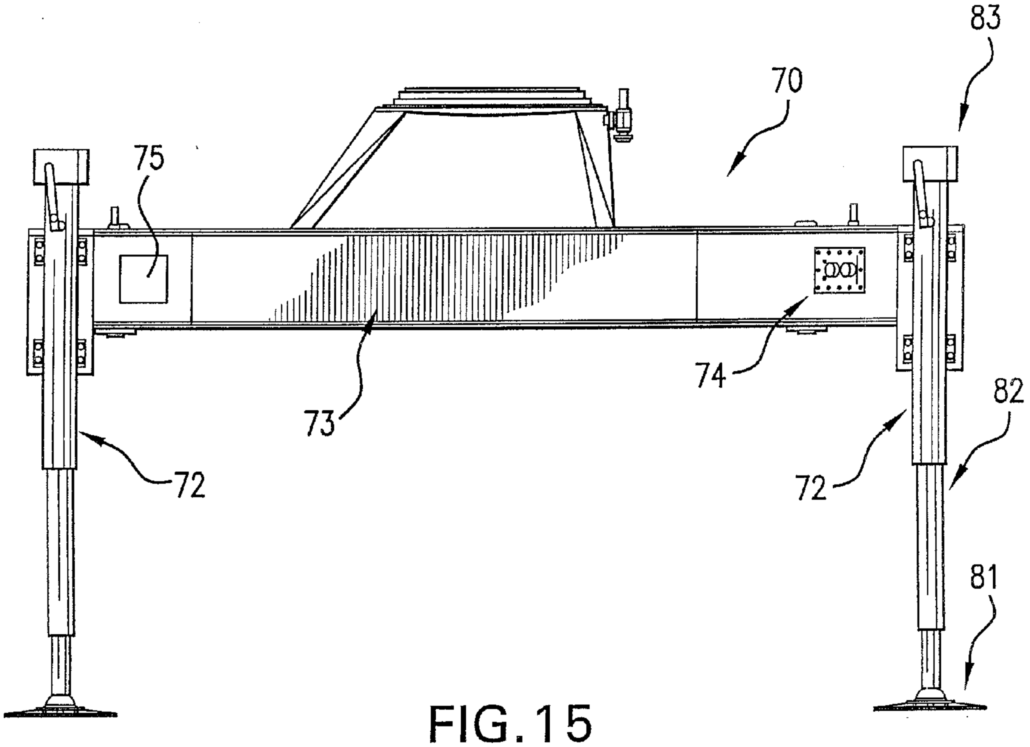
FIG. 15 is a front view of some of the elements in the first embodiment according to the present invention.
Figure 16:
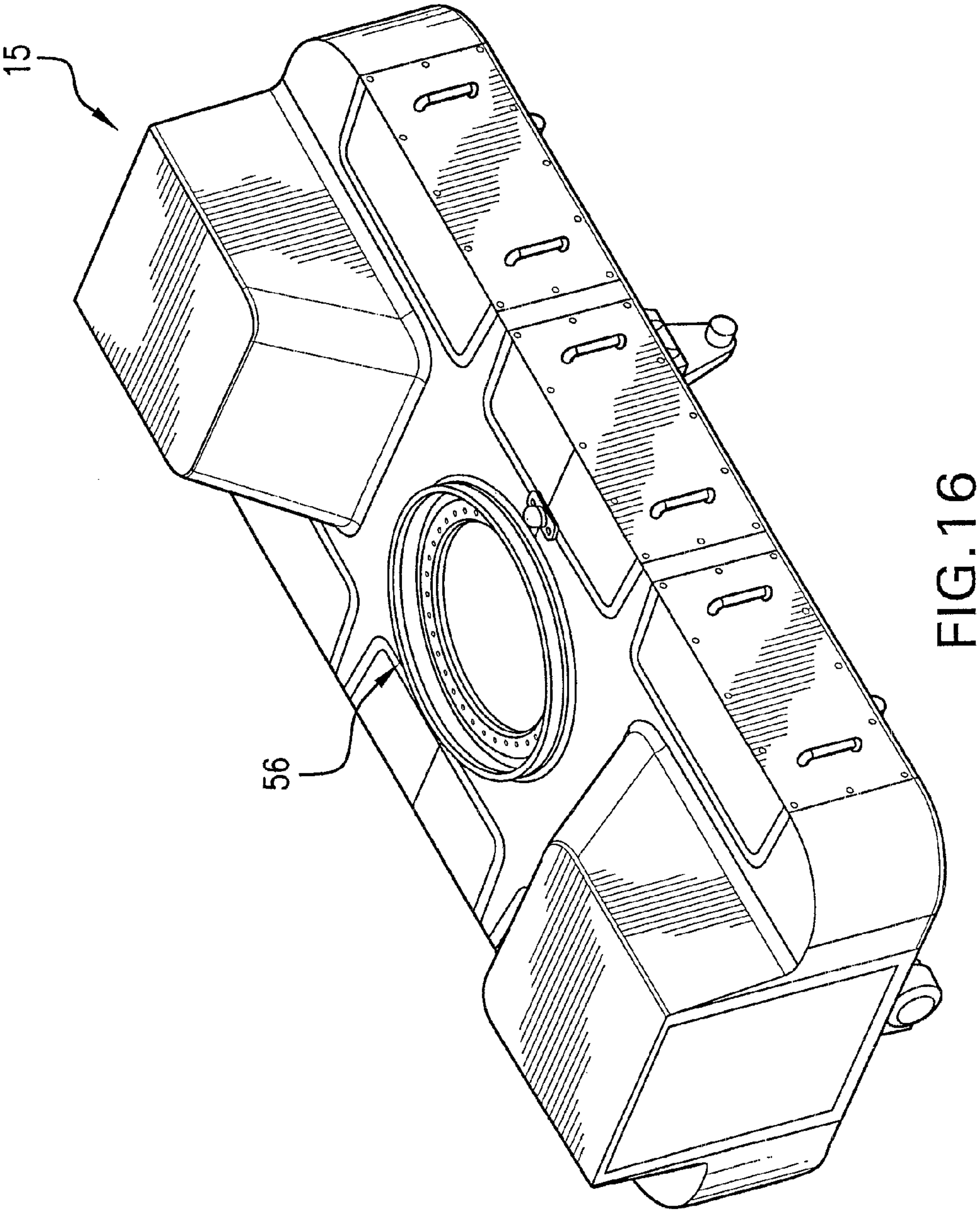
FIG. 16 is a perspective view of an underside of the structural platform depicted in FIG. 7.

Referring to FIGS. 14 and 15, the apparatus further comprises a support 70. Referring to FIG. 14, the support 70 comprises a main body 71, deployable jack stands 72, antenna deployment control interface ports 74 and an integrated antenna support platform structural health monitoring system 75. The main body 71 is constructed in the form of a modified H frame to facilitate transport and operation with a truck to which the H frame is readily accommodated. The main body 71 is preferably constructed primarily of advanced composite materials.

Each of the deployable jack stands 72 preferably comprises a jack base 81, a jack strut 82, and a jack manual control 83. The jack base 81 is the lower portion of the jack 72 that contacts the terrain surface. The jack strut 82 is a height-adjustable strut which is rigidly connected to the main body 71 and extends downwardly to engage the jack base 81. The jack control 83 is a manual lever control arm adjustably attached to the upper end of the jack strut 82. The operator turns the jack control 83 clockwise to extend the jack strut 82 and counter-clockwise to retract the jack strut 82. The deployable jack stands 72 are capable of either providing the sole means of support for the vehicle portable rotatable antenna system while in operation or may be used while the vehicle portable rotatable antenna system is positioned on a transport capable vehicle to provide additional stability. The deployable jack stands 72 can therefore support the vehicle portable rotatable antenna system on a flat surface or on sloped surfaces, on surfaces of a variety of types of materials (e.g., grass, dirt, gravel, rock, sand, etc.). The main body 71 can additionally or alternatively be configured with other types of deployable support members.

In a preferred modification according to the present invention, the extending and/or retracting of the jacks can be motorized, and/or the jacks and the main body 71 can be capable of automatically levelling (i.e., self-levelling).

In a further preferred modification according to the present invention, the extremities of the “H” structure can be extendible and retractable (i.e., from the perspective shown in FIG. 14, the “H” structure can be constructed so as to permit relative movement such that the locations of any or all of the jack stands 72 can be changed relative to the main body 71 in the plane of the page).

A preferred aspect of the present invention is the provision of an apparatus which can be supported in or on a vehicle, wherein no part of the apparatus extends beyond the sides of the vehicle.

A further preferred aspect of the present invention is that relative positions of the lateral extremities of the apparatus (relative to the platform, or to a vehicle on which the apparatus is mounted, for example) when in the deployed position do not extend beyond the locations that the lateral extremities of the apparatus occupy when in the stowed position.

A further preferred aspect of the present invention is that in the stowed position, the device (e.g., the antenna) lies flat and relatively low (e.g., relative to the top of a vehicle on which the apparatus is mounted and/or the top of the main body of the support of the apparatus.

Preferably, the apparatus includes cooling assemblies which preferably comprise a centrifugal airflow cleaner rigidly attached to the rear facing frame of the main body 71, and ducting to route air to the equipment bays located in the equipment cabinet 50 and to the antenna 2. A representative example of such a cooling assembly is described below in connection with the second embodiment.

Positioned within the main body 71 is an azimuth motor drive assembly 54 which, when activated, rotates the antenna mounting structure 15 and everything mounted thereon (i.e., including the equipment cabinets 50, the platform 11, the antenna 2, the backstay 10, the carriage 28, the drive element 22, the brackets 52, etc). Mounted on the main body 71 is an azimuth bearing race ring 55. When mounting the antenna mounting structure 15 on the main body 71, a corresponding ring 56 on the bottom of the equipment cabinet 50 (see FIG. 16) is positioned adjacent to the bearing race ring 55, such that the antenna mounting structure 15 is engaged to the azimuth motor drive assembly 54, whereby rotation of the azimuth motor drive assembly 54 will cause the antenna mounting structure 15, and everything mounted thereon, to rotate.

The azimuth bearing race ring 55 enables the azimuth motor drive assembly 54 to rotate the antenna mounting structure 15 at the rotational speed desired for antenna operation. In this embodiment, the azimuth bearing race ring 55 is comprised of steel with an inner diameter of about 18.5 inches, an outer diameter of about 19.8 inches and a thickness of about 1.9 inches. The azimuth bearing race ring 55 is constructed so as to be capable of withstanding the bearing applied loads which are expected to be encountered.

The antenna control interface ports 74 are located on the rear facing frame of the main body 71 and comprise a power port and a control port. The antenna control interface ports 74 provide the operator the power and controls necessary to deploy or stow the antenna 2 and to rotate the deployed antenna in azimuth. The antenna control interface utilizes several automatic interlocks to prevent inadvertent or improper operation of the vehicle portable rotatable antenna system (e.g., to prevent rotation of the antenna mounting structure 15 at all times other than when the apparatus is in the deployed orientation, and/or to prevent rotation of the drive element 22 when the antenna is rotating, etc.).

The integrated antenna support platform’s structural health monitoring system 75 comprises a plurality of stress/strain measuring material interconnected by wire traces and a monitoring port located on the rear facing frame of the main body 71. The integrated antenna support platform monitoring port is accessed using a standard computer connector port. The stress/strain measuring material is integrated into the antenna support platform’s advanced composite structure and is capable of reporting potential structural problems from overstress or damage the antenna support platform has encountered. The monitoring system 75 facilitates timely preventive maintenance on the vehicle portable rotatable antenna system, saving time, money and lowering potential risks to operators. Preferably, the monitoring system employs piezoelectric analysis of composite material by using a sender piezoelectric element, which sends waves, and a receiver piezoelectric element, which receives waves; the received waves can signify a potential problem (e.g., delamination) when a particular received wave pattern is observed.

In a preferred embodiment of a method of deploying an antenna, the antenna deployment operation begins with the deployment of the jack stands 72 to provide stability for the vehicle portable rotatable antenna system. After the jack stands 72 are deployed, the antenna is deployed by activating the variable speed servo motor and encoder 35 to drive the drive element 22. The speed of the drive element 22 is altered based on the phase of the operation being conducted. The antenna deployment is segmented into three distinct phases of operation which are distinguishable by the speed at which the drive element 22 rotates. The three phases of the antenna deployment are: (1) antenna lateral displacement, (2) antenna elevation to the operational position, and (3) lateral repositioning of the backstay 10 to its operational position.

Figure 17:
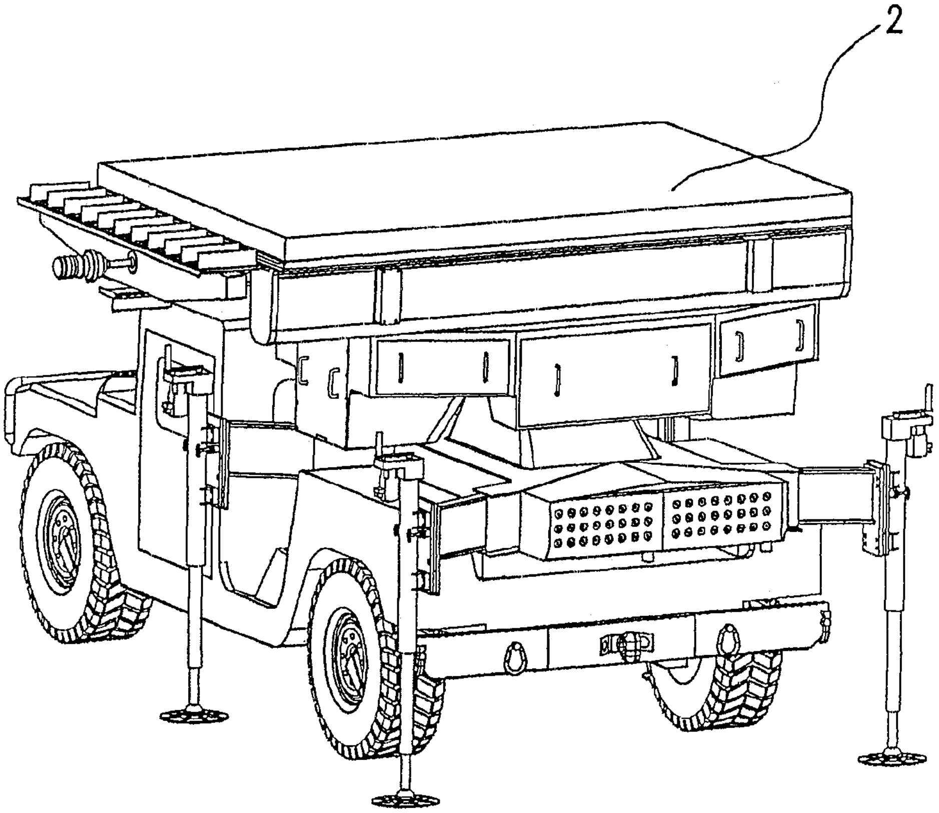
FIG. 17 is a perspective view of the first embodiment according to the present invention in a stowed orientation

Referring to FIG. 17, the vehicle portable rotatable antenna system is viewed from behind the rear facing frame of the main body 71 with the antenna 2 stowed horizontally above the platform 11 on the top of the equipment cabinet 50. At this position and orientation, the vehicle portable rotatable antenna system's center of gravity ("CG") is located directly over the center of the main body 71 (also the CG of the main body 71). The carriage 28 is positioned near the end of the rails 26 closest to the right side of the equipment cabinet 50.

Figure 18:
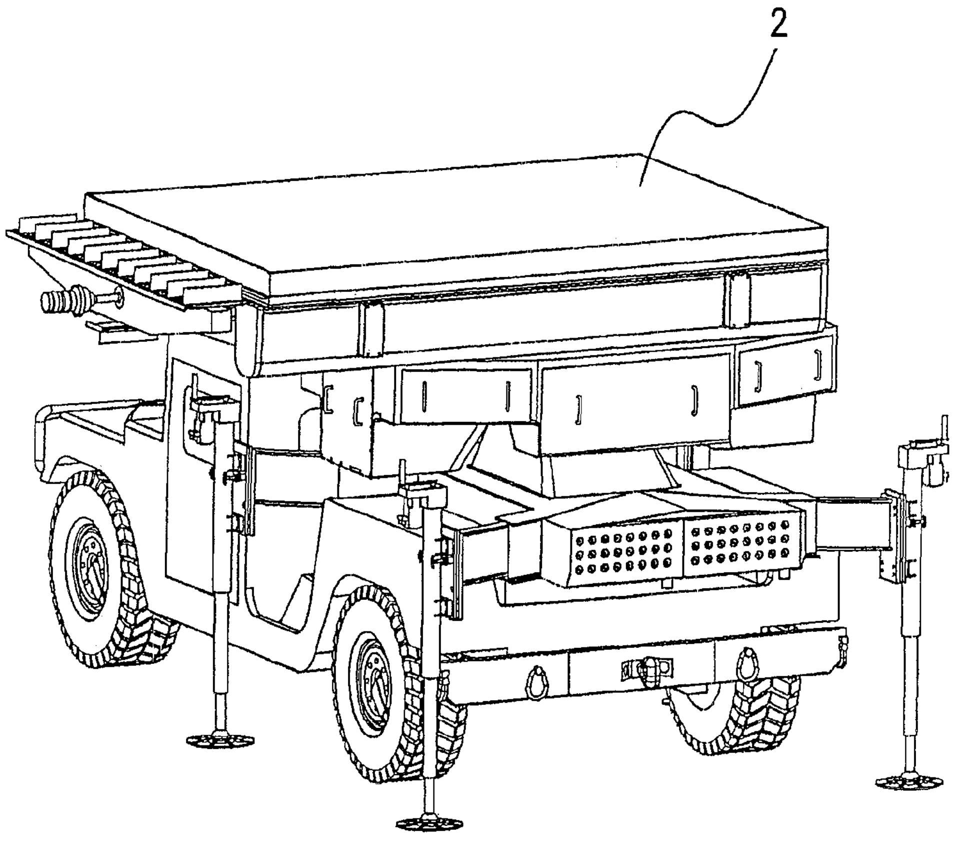
FIG. 18 is a perspective view of the first embodiment according to the present invention in an intermediate orientation, i.e., after lateral displacement.

Referring to FIG. 18, during the lateral displacement phase (during which the carriage 28, the backstay 10 and the antenna 2 move from the orientation depicted in FIG. 5 to the orientation depicted in FIG. 4), the variable speed servo motor 35 rotates the drive element 22, causing the drive element nut 23 and the carriage 28 to move from right to left along the rails 26. The motion of the carriage 28 is imparted to the lower edge 43 of the backstay 10 and in turn to the antenna 2, causing the antenna 2 to be laterally displaced to the left of the center of the main body 71. During the lateral displacement phase, the surfaces of the protective strips 6 are in rolling contact with the roller supports 53, providing support to the antenna 2. The protrusions 58 of the brackets 52 slide within the slots 8 of the antenna 2. The lateral displacement phase of operation terminates when the protrusions 58 reach the ends (the lower ends in the orientation shown in FIG. 6) of the slots 8. The motor 35 preferably operates at a higher rate of rotation (relative to during other phases, as discussed below) during this phase of operation because it is opposed by comparatively smaller loads during this phase of operation. In a preferred modification, the surfaces of the protective strips 6 are cambered such that the antenna 2 is lifted to some degree while the antenna 2 is being displaced laterally.

Figure 19:
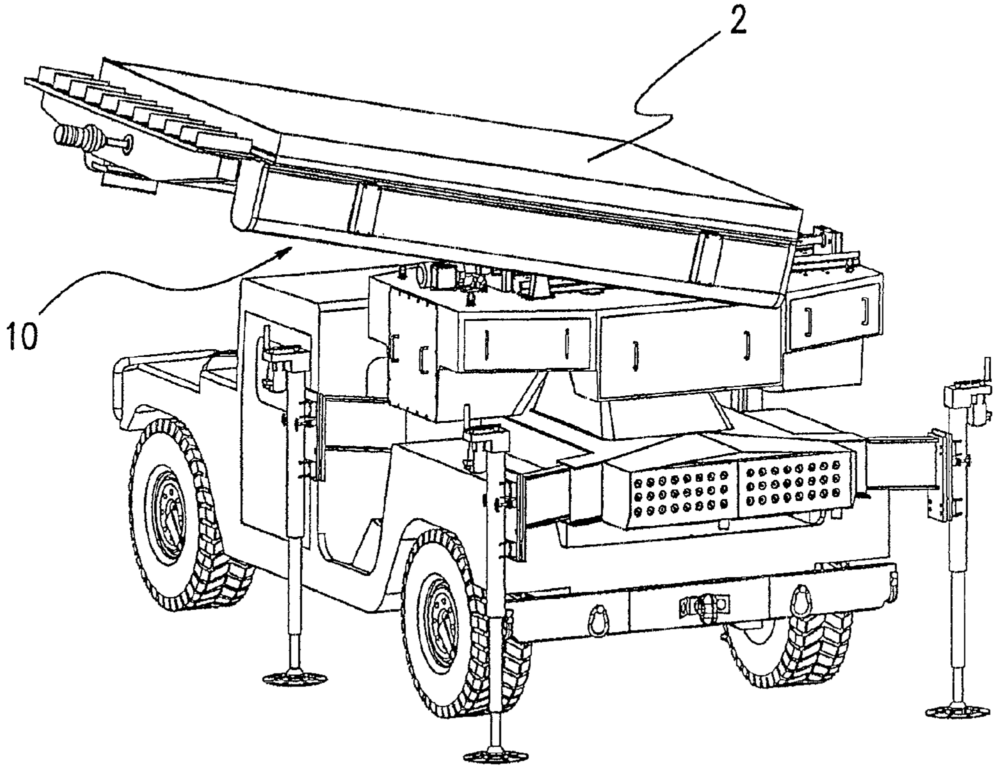
FIG. 19 is a perspective view of the first embodiment according to the present invention partway between the intermediate orientation and a deployed orientation.

Referring to FIG. 19, the continued rotation of the drive element 22 after the protrusions 58 have come into contact with the end of the slots 8 commences the elevation phase. The carriage 28 continues to move laterally to the left but the walls of the slots 8 engaging the protrusions 58 prevent further lateral displacement of the antenna 2. The motion of the carriage 28 begins to move the lower edge 43 of the backstay 10 away from the antenna 2, which creates a force which rotates the antenna 2 about the protrusions 58, whereby the left end (in the orientation shown in FIG. 19) of the antenna 2 begins to lift. The motor 35 preferably operates at a lower rate of rotation during this phase of operation because it must overcome comparatively higher loads during this phase. During this phase, the protective strips 9 of the antenna rotatably slide on the ledges 57 of the brackets 52.

Figure 20:
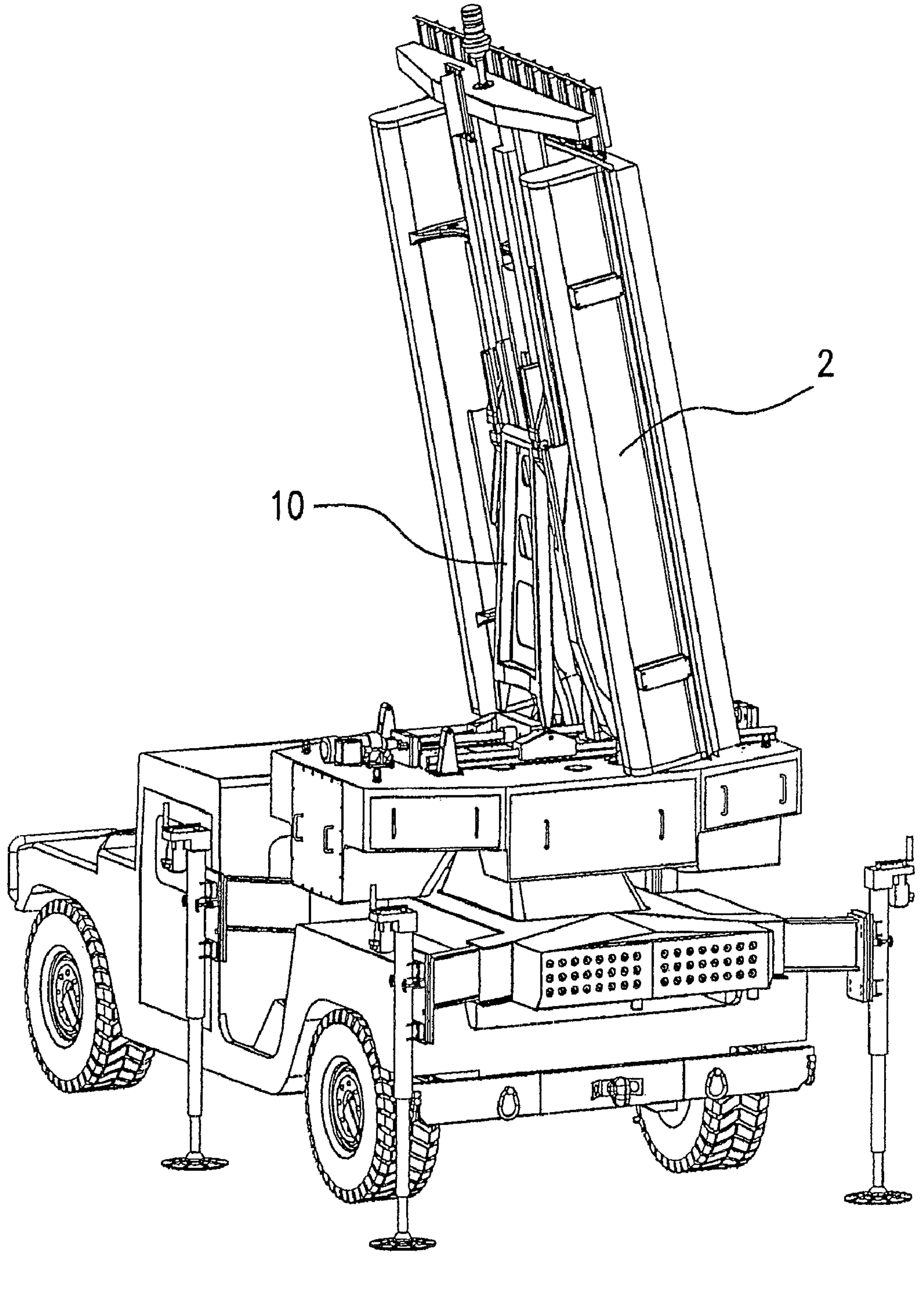
FIG. 20 is a perspective view of the first embodiment according to the present invention at its maximum antenna elevation.

Referring to FIG. 20, during the elevation phase, the backstay 10 and carriage 28 are in relatively close proximity to the lower edge of the antenna 2. The antenna 2 is driven to an angle (shown in FIG. 20) which is beyond the desired antenna operational angle during this phase of operation. In the disclosed configuration, the antenna is driven to about 86 degrees of elevation during the elevation phase (the desired operational angle is about 70 degrees).

During the lateral repositioning phase, the angle of the antenna is lowered to the desired operational angle (at which point the carriage 28, the backstay 10 and the antenna 2 are in the orientation depicted in FIG. 3).

Figure 21:
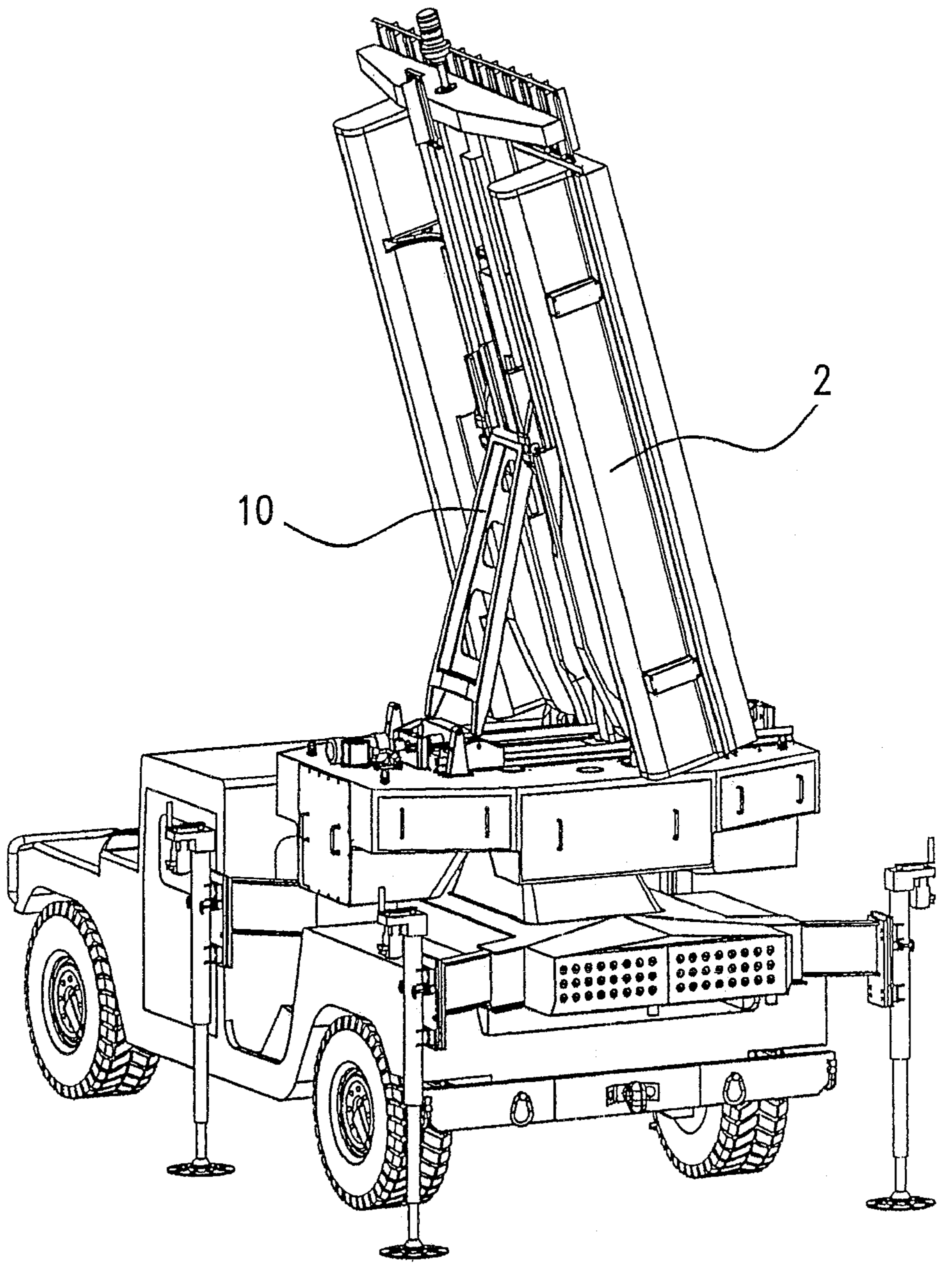
FIG. 21 is a perspective view of the first embodiment according to the present invention in its deployed orientation.

Referring to FIG. 21, the continued rotation of the drive element 22 after the antenna has been elevated to its highest angle commences the lateral repositioning of the backstay phase of operation. The carriage 28 continues to move laterally to the left, moving the attached lower edge 43 of the backstay 10 away from the lower edge of the antenna 2. This phase of operation completes at the deployed antenna operational position, where the carriage 28 is at its leftmost position along the rails 26 and the backstay 10 is positioned to provide at least sufficient structural support to the antenna 2 during rotation of the antenna 2. The motor 35 preferably operates at an intermediate rate of rotation during this phase of operation because the loads faced will be lower, although they may vary based on the environmental conditions encountered. Operation at an intermediate speed helps to avoid overstressing components during this phase of operation. When the antenna 2 is deployed, the vehicle portable rotatable antenna system's center of gravity (CG) is located directly over the center of the main body 71.

The antenna can be rotated about a vertical or substantially vertical axis by activating the azimuth motor drive assembly 54 which, as noted above, rotates the antenna mounting structure 15 and everything mounted thereon, including the antenna 2.

Because rotating the antenna when it is not oriented at the desired operational angle could potentially exceed the antenna's load capabilities, the vehicle portable rotatable antenna system preferably contains interlocks to prevent rotation of the antenna except when the antenna is in the deployed position.

Figure 22:
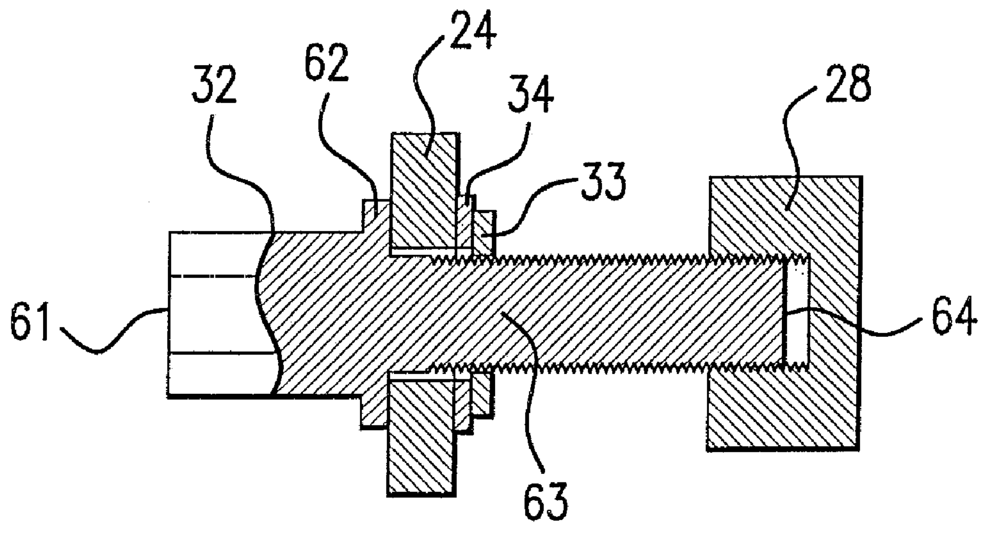
FIG. 22 is a partial section view of a locking screw 32 of the first embodiment according to the present invention.

Preferably, to prevent movement of the carriage 28 while the antenna 2 is in the operational position, at least one, preferably two, manual locking screws 32 are provided (see FIG. 22). In the embodiment depicted in FIG. 22, the locking screws 32 have a hex end 61, a flange 62, a shaft 63 and a screw-threaded end 64. In use, the locking screw(s) is positioned such that the flange 62 abuts one side of the end support 24 which is closest to the carriage 28 when the apparatus is in the deployed orientation, and such that the shaft 63 extends through an opening in that end support 24, and the screw-threaded end 64 is threaded into a threaded bore in the carriage 28. Preferably, in addition, a hex nut 33 is positioned around the (or each) shaft 63, with a washer 34 positioned between the end support 24 and the hex nut 33, and after threading the screw-threaded end 64 into the bore in the carriage 28, the hex nut 33 is tightened on threads on the shaft 63 to push the washer 34 into tight engagement with the end support 24, whereby the carriage 28 is locked in place relative to the end support 24 (and therefore relative to the platform 11).

The deployed antenna's speed of rotation is controlled using the control interface 74 ports provided on the main body 71. The rotation speed of the antenna is dependent on the requirements of the sensor's mode of operation, the environmental conditions and the capabilities of the azimuth motor drive assembly 54. Preferably, the antenna can be rotated at any desired rate, e.g., 7.5 rpm, 15 rpm and 30 rpm.

To initiate the antenna stowing operation, the antenna 2 must be not rotating. The hex jam nuts 33 and associated flat washers 34 (if provided) must be loosened, and the manual locking screws 32 (if provided) must then be unthreaded from the carriage 28 center section and removed.

Similar to the antenna deployment operation, the antenna stow operation can similarly be segmented into three distinct phases of operation, in reverse order. The three phases of the antenna stowing are: (1) the repositioning of the carriage 28 and lower edge 43 of the backstay 10 toward the base of the antenna 2, (2) the lowering of the antenna to the intermediate orientation and (3) the centering of the antenna on the center of the main body 71.

Referring to FIG. 21, the rotation of the drive element 22 in the direction opposite from the antenna deployment operation begins to laterally reposition the carriage 28 and the lower edge 43 of the backstay 10. In this phase of the stow operation, the carriage 28 moves laterally to the right, when viewed from perspective depicted in FIG. 21, moving the attached lower edge 43 of the backstay 10 toward the lower edge of the antenna 2. This phase of operation completes when the carriage 28 is in close proximity to the lower edge of the antenna 2. The motor 35 preferably operates at an intermediate rate during this phase of operation, as in phase (3) of the antenna deployment.

Referring to FIGS. 19 and 20, when the backstay 10 and carriage 28 are in close proximity to the lower edge of the antenna 2, continued rotation of the drive element 22 commences the antenna lowering phase of operation. As the backstay 10 and carriage 28 continue moving to the right, past their closest point to the antenna 2, the motion of the backstay 10 and carriage 28 permits the antenna 2 to rotate relative to the protrusions 58, whereby the upper edge of the antenna 2 moves downward toward the horizontal plane. The antenna lowering phase of operation continues until the antenna 2 is substantially horizontal above the platform 11 on the equipment cabinet 50 but laterally displaced to the left of the center of the main body 71 (at which point the carriage 28, the backstay 10 and the antenna 2 are in the orientation depicted in FIG. 4). The motor 35 preferably operates at a low rate during the antenna lowering phase, similar to phase (2) of the antenna deployment.

Referring to FIGS. 17 and 18, the continued rotation of the drive element 22 moves the antenna 2 laterally from left to right, toward the center of the main body 71. During most of the antenna centering phase, the surfaces of the protective strips 6 roll on two of the support rollers 53 (the two to the left from the perspective shown in FIG. 7), and at the end of the antenna centering phase, the surfaces of the protective strips 6 roll on all four of the support rollers 53 (or the surfaces of the protective strips 6 roll on two of the rollers 53 and the protective strips 9 roll on the other two rollers 53). The protrusions 58 slide within the slots 8 of the antenna 2 during this phase. The antenna centering phase terminates when the lower edge 43 of the backstay 10 and the carriage 28 have returned to their stowed positions near the end of the rails 26 closest to the right side of the equipment cabinet 50 (as viewed in FIG. 17) (during the antenna centering phase, the carriage 28, the backstay 10 and the antenna 2 move from the orientation depicted in FIG. 4 to the orientation depicted in FIG. 5). Preferably, the motor operates at a higher rate during this phase, similar to phase (1) of the antenna deployment.

In the embodiment depicted in FIGS. 1-21, the antenna mounting structure 15 and everything mounted thereon (e.g., the platform 11, the antenna 2, the backstay 10, the carriage 28, the drive element 22, the brackets 52, etc.) are oriented such that as the antenna is moved from the intermediate position to the deployed position, it is rotated about an axis which is perpendicular to a line drawn parallel to the axles of the vehicle. The apparatus can instead be oriented such that as the antenna is moved from the intermediate position to the deployed position, it is rotated about an axis which is parallel to the axles of the vehicle.

In such an apparatus, preferably, the edge of the antenna which is the highest when in the deployed orientation is positioned closer to the front of the vehicle, when the apparatus is in the intermediate position or the stowed position, than the opposite edge of the antenna, i.e., the edge which is the lowest when in the deployed orientation. In such an apparatus, if the antenna is repositioned after being rotated from the deployed position to the intermediate position, the antenna would be moved toward the rear of the vehicle—alternatively, the intermediate position can, if desired, also be the stowed position (i.e., after pivoting the antenna about a horizontal axis parallel to the axles such that the antenna is substantially horizontal, the antenna does not need to be repositioned for stowage and transport operations). Preferably, in any case, the antenna does not extend forward of the windshield of the vehicle, in order to avoid reducing the field of vision of the driver of the vehicle.

In any of the apparatuses described above, it might be deemed desirable to reposition the antenna, following (or instead of) repositioning from the intermediate position to the stowed position, beyond what would be possible in view of constraints imposed, e.g., by the length of the rails. Such repositioning ability can be provided in any of a variety of suitable ways, e.g., by providing a pin which extends through the backstay and which normally restrains the backstay from movement relative to the antenna mounting structure or which normally restrains the antenna from movement relative to the backstay, which pin can be removed to permit such relative movement.

Preferably, straps or other tethering is providing for securing the apparatus, particularly the antenna, during vehicular transport.

Preferably, in the stowed position, and particularly during transport, the center of gravity of the apparatus is vertically substantially aligned with a strongly supporting portion of the vehicle, e.g., a cross beam in a truck.

Figure 23:
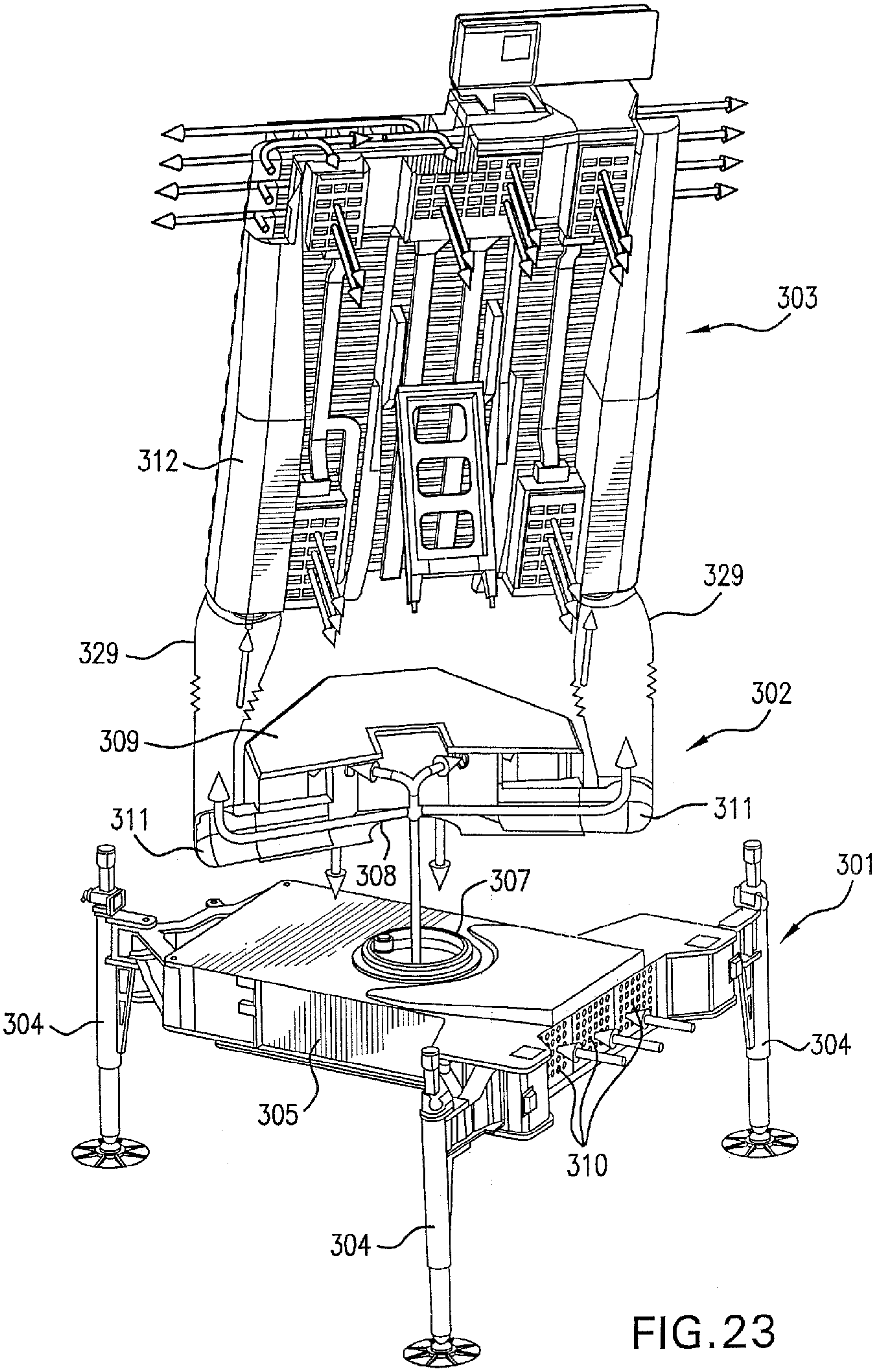
FIG. 23 is an exploded schematic view depicting portions of a second embodiment according to the present invention.

FIG. 23 is an exploded schematic view depicting portions of a second embodiment according to the present invention. FIG. 23 depicts a support structure 301, an antenna mounting structural platform 302 and an antenna structure 303. The support structure 301 includes three jack stands 304, a sealed pedestal 305 and an azimuth bearing 307. The antenna mounting structural platform 302 includes a center duct section 308 and an equipment cabinet 309.

The embodiment depicted in FIG. 23 includes an ambient air cooling system for cooling electronic components positioned within the sealed pedestal 305, electronics positioned within the equipment cabinet 309 and electronics mounted in and on the antenna structure 303. The following is a description of this cooling system.

Ambient air enters through three banks of filters 310. In this embodiment, the filters 310 each comprise a plurality of centrifugal separators, a variety of such devices being well known to those skilled in the art. Representative examples of such separators include inertial separators from Pneumafil, Centrisep particle separators from Heli-Conversions and centrifugal separator devices sold by the Pall Aeropower Corporation. Such inertial separator devices each generally comprise a plurality of inertial separator elements which each comprise a tube with vanes which cause air sucked into the tube to spin, whereby moisture and/or particulate materials migrate toward the outer perimeter of the tube, from which they are sucked out of the tube by a purge fan, while the cleaned air stays near the center of the tube and is passed to the clean air exit from the separator. Preferably, air is sucked into the separator by means of a downstream fan (or fans) contained within a chamber which communicates with the outlet from the separator, whereby the fan or fans cause air to enter into the separator and pass through the separator into the chamber and then through the fan or fans. The separators are preferably combined with self-cleaning air passages to minimize fouling of heat transfer surfaces. In order to minimize the collection of debris, the air passages and all heat exchangers are preferably oriented downward so that air flow effectively clears the system. Preferably, access for cleaning and decontamination is provided in suitable locations.

Referring again to FIG. 23, the cleaned air passes from the exit side of the separators into the sealed pedestal 305. Preferably, the fan or fans include an integral controller with temperature, speed and flow sensing to provide feedback for variable speed operation, to result in optimized system power draw.

The filtered ambient air enters the inside of the sealed pedestal 305 through the fans, and cooling air is guided past heat sinks integral to electronic enclosures within the pedestal 305. Air passes from the pedestal 305 through the region surrounded by the azimuth bearing 307 and into the center duct section 308 of the antenna mounting structural platform 302 (the structural platform 302 is depicted in partial section in order to enable illustration of the interior of the equipment cabinet 309). Preferably, ducts of various sizes distribute air from the center duct section 308. Preferably, sizing of the various ducts provides metering of required air flow rate to electronics contained within one or more chambers within the equipment cabinet 309 and to the antenna structure 303. Optionally, movable orifice plates can be provided at appropriate locations in order to precisely adjust metered airflow throughout the apparatus.

Consistent with other descriptions herein, when the antenna structure 303 is rotating, the antenna mounting structural platform 302 is rotated in order to rotate the antenna structure 303. Cooling air from the center duct section 308 passes through mounting structure plenums 311, through ducts 329 (which are preferably flexible) and then into antenna plenums 312. If desired, the ducts 329 can be removable, and can be attached after the antenna has been moved to the deployed position. Preferably, cool air is directed into alternate horizontal plenums within the antenna structure 303. Preferably, the spacing of the horizontal plenums coincides with the spacing of rows of modular heat transfer cartridges each positioned adjacent to a hot spot on the antenna structure 303 (typically, hot spots are at positions adjacent to the electronic components for operating a radar transmitter and/or receiver). Representative examples of suitable systems of plenums for use in this embodiment include any of the apparatuses disclosed in U.S. patent application Ser. No. 60/686,006, filed May 31, 2005, the entirety of which is hereby incorporated by reference. Preferably, orifices in the horizontal plenums provide unheated air with substantially equal flow and substantially equal pressure to each modular heat sink. Representative examples of suitable heat sinks for use in this embodiment include any of the modular heat sink devices as disclosed in U.S. patent application Ser. No. 60/685,855, filed May 31, 2005, the entirety of which is hereby incorporated by reference. Where such modular heat sink devices are employed, the cool air impinges on the heat sink fins, conductive heat transfer takes place, and the heat sink fins then direct the heated air to sealed ducts above and below each heat sink. The heated air is collected and exhausted out of both sides of the antenna structure 303 (i.e., to the right and left sides in the orientation shown in FIG. 23), and preferably also out of the back side of the antenna structure 303 (i.e., the side substantially facing the viewer in FIG. 23).

The embodiment depicted in FIG. 23 provides a number of favorable properties. For example, this embodiment provides a maintainability and performance advantage due to the integration of all fans in a single location and on a non-rotating structure. Maintenance personnel does not have to climb all over the radar device in order to perform cooling system maintenance. Both the separator and the fans are single-person lift and are readily and directly accessible from the ground, preferably by loosening screws and pulling the separator out. The fans are positioned directly behind the separators and preferably can also be slid out. This apparatus further minimizes the collection of dust and dirt inside the cooling channels, while access and cleaning is available when maintenance is required. A relatively short and direct thermal path is formed between the active devices and the heat removal air.

Figure 24:
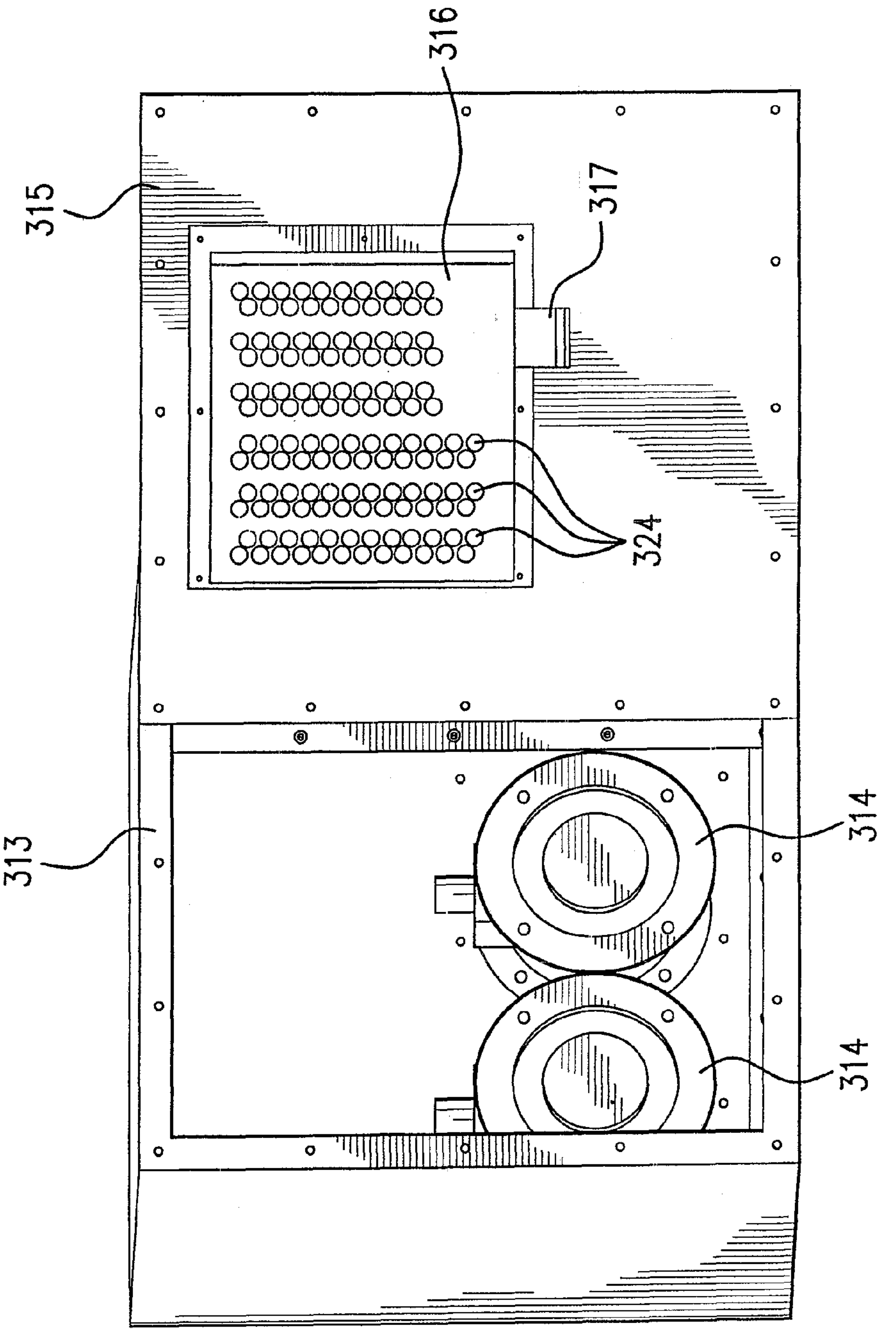
FIG. 24 depicts an enclosure 313 of the second embodiment according to the present invention.

FIG. 24 depicts apparatus which can be employed as the filters 310, equipment to allow the filters 310 to function properly, and structure to support the filters in the second embodiment. FIG. 24 depicts an enclosure 313 which houses a pair of fans 314. In FIG. 24, the front panel of the enclosure 313 has been removed in order to illustrate the fans 314. Mounted on the front of the front panel 315 is a bank 316 of centrifugal particle separators 324 which has a purge outlet 317. In operation, the front panel 315 is (i.e., has already been) attached to the enclosure 313 with the bank 316 of centrifugal particle separators 324 on the outside. The fans 314 are activated and a scavenger fan is (i.e., has already been) attached to the purge outlet 317. Air is then pulled by the fans 314 through the centrifugal particle separators and then out the back of the enclosure 313, while moisture and/or particulate material is pulled out through the purge outlet 317.

In a preferred aspect of the present invention, there are provided a communications vehicle and a radar vehicle. In this aspect, the radar vehicle has an apparatus as described herein mounted thereon and the communications vehicle has communications equipment for transmitting and/or receiving information relating to information gathered by radar equipment on the radar vehicle. Information can be passed from the radar vehicle to the communications vehicle (or vice-versa) in any suitable way, a wide variety of which are well known to those skilled in the art, e.g., through fiber optic cable which is spooled in the communications vehicle and which can be unwound and plugged into a receptacle on the radar vehicle.

Any two or more structural parts of the apparatuses described herein can be integrated. Any structural part of the apparatuses described herein can be provided in two or more parts which are held together, if necessary. Similarly, any two or more functions can be conducted simultaneously, and/or any function can be conducted in a series of steps.

The invention claimed is:

1. An apparatus for propping a device, comprising:

a platform;

at least a first bracket for slidably engaging a first portion of a device to be propped, said bracket being mounted on said platform;

at least one screw-threaded drive element, said drive element being rotatable about its longitudinal axis, said drive element having drive element threads on a surface thereof;

at least one rail mounted on said platform, said at least one rail extending in a direction substantially parallel to said longitudinal axis of said drive element, said at least one rail having a substantially uniform cross-sectional shape in planes substantially perpendicular to said longitudinal axis of said drive element;

a carriage having at least one rail engaging portion and at least one threaded portion, said rail engaging portion being of a shape which engages said rail, said threaded portion of said carriage having carriage threads which are in threaded engagement with said drive element threads, said carriage having at least one backstay mounting element;

a backstay, a first portion of said backstay being rotatably attached to said backstay mounting element such that said first portion of said backstay is free to rotate relative to said backstay mounting element about an axis which is substantially perpendicular to said longitudinal axis of said drive element, said backstay having a second portion for rotatably engaging a second portion of said device to be propped;

said drive element being rotatably supported by a drive element support and being threadedly supported by said threaded portion of said carriage, rotation of said drive element about its longitudinal axis causing said carriage to move in a direction substantially along said longitudinal axis due to said threaded engagement, which causes said first portion of said backstay to move relative to said bracket, which causes said second portion of said backstay to move relative to said bracket.

2. An apparatus as recited in claim 1, wherein said bracket comprises a ledge for slidably supporting said first portion of said device to be propped.

3. An apparatus as recited in claim 1, wherein if a device to be propped is mounted on said apparatus with said first portion of said device slidably engaging said bracket and said second portion of said device rotatably engaging said second portion of said backstay, rotation of said drive element in a first rotational direction about its longitudinal axis causes said carriage to move from a first carriage position to a second carriage position, which causes said device to rotate about an axis perpendicular to said longitudinal axis, with said first portion of said device rotating relative to said bracket.

4. An apparatus as recited in claim 1, wherein if a device to be propped is mounted on said apparatus with said first portion of said device slidably engaging said bracket and said second portion of said device rotatably engaging said second portion of said backstay, rotation of said drive element in a first rotational direction about its longitudinal axis causes said carriage to move from a first carriage position to a second carriage position, which causes said device to be moved in a direction parallel to said longitudinal axis from a first device position to a second device position, with said first portion of said device sliding relative to said bracket, and continued rotation of said drive element in said first rotational direction about its longitudinal axis causes said carriage to move from said second carriage position to a third carriage position, which causes said device to rotate about an axis perpendicular to said longitudinal axis, with said first portion of said device rotating relative to said bracket.

5. An apparatus as recited in claim 1, wherein said apparatus comprises a second bracket mounted on said platform, said first bracket comprising a first bracket protrusion which is engageable with a first slot on said device, said first bracket protrusion being slidable within said first slot and being rotatable about a first bracket protrusion axis substantially perpendicular to said longitudinal axis of said drive element;

said second bracket comprising a second bracket protrusion which is engageable with a second slot on said device, said second bracket protrusion being slidable within said second slot and being rotatable about a second bracket protrusion axis substantially perpendicular to said longitudinal axis of said drive element.

6. An apparatus as recited in claim 1, wherein said apparatus comprises said at least one rail and a second rail mounted on said platform, said second rail extending in a direction substantially parallel to said at least one rail, said carriage having a second rail engaging portion which engages said second rail.

7. An apparatus as recited in claim 1, further comprising a device to be propped, said device comprising said first portion slidably engaged by said bracket, said device further comprising said second portion rotatably engaged by said second portion of said backstay.

8. An apparatus as recited in claim 1, further comprising a support, said support comprising a platform mounting portion on which said platform is mounted, said platform being rotatable relative to said support.

9. An apparatus comprising:

a device, said device being movable between a stowed position and a deployed position;

a platform;

at least a first bracket slidably engaging a first portion of said device, said bracket being mounted on said platform;

at least one screw-threaded drive element, said drive element being rotatable about its longitudinal axis, said drive element having drive element threads on a thereof;

at least one rail mounted on said platform, said at least one rail extending in a direction substantially parallel to said longitudinal axis of said drive element, said at least one rail having a substantially uniform cross-sectional shape in planes substantially perpendicular to said longitudinal axis of said drive element;

a carriage having at least one rail engaging portion and at least one threaded portion, said rail engaging portion being of a shape which engages said rail, said threaded portion of said carriage having an axis which is substantially coaxial with said longitudinal axis of said drive element, said threaded portion of said carriage having carriage threads which are in threaded engagement with said drive element threads, said carriage having at least one backstay mounting element;

a backstay, a first portion of said backstay being rotatably attached to said backstay mounting element such that said first portion of said backstay is free to rotate relative to said backstay mounting element about an axis which is substantially perpendicular to said longitudinal axis of said drive element, said backstay having a second portion rotatably engaging a second portion of said device;

said drive element being rotatably supported by a drive element support and being threadedly supported by said threaded portion of said carriage, rotation of said drive element about its longitudinal axis causing said carriage to move in a direction substantially along said longitudinal axis due to said threaded engagement, which causes said first portion of said backstay to move relative to said bracket, which in turn causes said second portion of said backstay to move relative to said bracket, which in turn causes said device to move between said stowed position and said deployed position.

10. An apparatus as recited in claim 9, wherein said bracket comprises a ledge slidably supporting said first portion of said device.

11. An apparatus as recited in claim 9, wherein rotation of said drive element in a first rotational direction about its longitudinal axis causes said carriage to move from a first carriage position to a second carriage position, which causes said device to rotate about an axis perpendicular to said longitudinal axis, with said first portion of said device rotating relative to said bracket, to move to said deployed position.

12. An apparatus as recited in claim 9, wherein rotation of said drive element in a first rotational direction about its longitudinal axis causes said carriage to move from a first carriage position to a second carriage position, which causes said device to be moved in a direction parallel to said longitudinal axis from said stowed position to an intermediate device position, with said first portion of said device sliding relative to said bracket, and continued rotation of said drive element in said first rotational direction about its longitudinal axis causes said carriage to move from said second carriage position to a third carriage position, which causes said device to rotate about an axis perpendicular to said longitudinal axis, with said first portion of said device rotating relative to said bracket, to move to said deployed position.

13. An apparatus as recited in claim 9, wherein said apparatus comprises a second bracket mounted on said platform, said first bracket comprising a first bracket protrusion which is engageable with a first slot on said device, said first bracket protrusion being slidable within said first slot and being rotatable about a first bracket protrusion axis substantially perpendicular to said longitudinal axis of said drive element;

said second bracket comprising a second bracket protrusion which is engageable with a second slot on said device, said second bracket protrusion being slidable within said second slot and being rotatable about a second bracket protrusion axis substantially perpendicular to said longitudinal axis of said drive element.

14. An apparatus as recited in claim 9, wherein said first bracket protrusion axis and said second bracket protrusion axis are co-linear.

15. An apparatus as recited in claim 9, wherein said apparatus comprises said at least one rail and a second rail mounted on said platform, said second rail extending in a direction substantially parallel to said at least one rail, said carriage having a second rail engaging portion which engages said second rail, said second rail having a substantially uniform cross-sectional shape in planes substantially perpendicular to said longitudinal axis of said drive element.

16. An apparatus as recited in claim 9, further comprising a plurality of device supports, said device being supported by at least two of said device supports when said device is in said stowed position.

17. An apparatus as recited in claim 9, further comprising a support, said support comprising a platform mounting portion on which said platform is mounted, said platform being rotatable relative to said support.

18. An apparatus as recited in claim 17, wherein said device is a sensor.

19. An apparatus as recited in claim 18, wherein said device is a radar antenna.

20. An apparatus as recited in claim 17, wherein said support has a plurality of adjustable stands which can be adjusted to make said platform mounting portion substantially level.

21. An apparatus as recited in claim 9, wherein a first plane defined by any three points of said device when in said stowed position and a second plane defined by said three points of said device when in said deployed position are offset from being substantially parallel to each other by only rotation about an axis which is perpendicular to said longitudinal axis of said drive element.

22. An apparatus as recited in claim 21, wherein said three points of said device are in said first plane when said device is in said intermediate position.

23. An apparatus as recited in claim 9, wherein a center of gravity of said device when in said deployed position is displaced from a center of gravity of said device when in said stowed position only substantially vertically.

24. An apparatus as recited in claim 9, wherein a center of gravity of said device, when said device is in said stowed position, lies along an axis of rotation of said device relative to said support, when said device is in said deployed position.

25. An apparatus as recited in claim 9, wherein said device, when in said stowed position, does not extend beyond said platform in either direction along said longitudinal axis of said drive element.

26. An apparatus, comprising:

a platform structure, said platform structure defining an enclosed space;

a support, said support comprising a substantially circular platform mounting portion on which said platform structure is mounted, said platform structure being rotatable relative to said support;

a duct extending from said support through said platform mounting portion and into said enclosed space within said platform structure; and at least one fan positioned in said support, a downstream side of said fan communicating with said duct, whereby fluid can be passed from said fan through said duct and into said enclosed space while said platform structure is rotating relative to said support.

27. An apparatus as recited in claim 26, further comprising at least one centrifugal separator upstream of said fan relative to said duct.

28. An apparatus as recited in claim 26, further comprising a device, said device being movable between a stowed position and a deployed position;

at least a first bracket slidably engaging a first portion of said device, said bracket being mounted on said platform structure;

at least one screw-threaded drive element, said drive element being rotatable about its longitudinal axis, said drive element having drive element threads on a thereof;

at least one rail mounted on said platform structure, said at least one rail extending in a direction substantially parallel to said longitudinal axis of said drive element, said at least one rail having a substantially uniform cross-sectional shape in planes substantially perpendicular to said longitudinal axis of said drive element;

a carriage having at least one rail engaging portion and at least one threaded portion, said rail engaging portion being of a shape which engages said rail, said threaded portion of said carriage having carriage threads which are in threaded engagement with said drive element threads, said carriage having at least one backstay mounting element;

a backstay, a first portion of said backstay being rotatably attached to said backstay mounting element such that said portion of said backstay is free to rotate relative to said backstay mounting element about an axis which is substantially perpendicular to said longitudinal axis of said drive element, said backstay having a second portion rotatably engaging a second portion of said device;

said drive element being rotatably supported by a drive element support and being threadedly supported by said threaded portion of said carriage, rotation of said drive element about its longitudinal axis causing said carriage to move in a direction substantially along said longitudinal axis due to said threaded engagement, which causes said first portion of said backstay to move relative to said bracket, which in turn causes said second portion of said backstay to move relative to said bracket, which in turn causes said device to move between said stowed position and said deployed position.

29. A method of propping a device, comprising:

rotating a drive element about a longitudinal axis of said drive element, said drive element having drive element threads which are in engagement with carriage threads provided on a threaded portion of a carriage, said carriage having at least one rail engaging portion, said rail engaging portion being of a shape which engages a rail mounted on a platform, said carriage having at least one backstay mounting element of a backstay, said rail extending in a direction substantially parallel to said longitudinal axis of said drive element, said rail having a substantially uniform cross-sectional shape in planes substantially perpendicular to said longitudinal axis of said drive element, said drive element being rotatably supported by a drive element support and being threadedly supported by said threaded portion of said carriage, a first portion of said backstay being rotatably attached to said backstay mounting element such that said first portion of said backstay is free to rotate relative to said backstay mounting element about an axis which is substantially perpendicular to said longitudinal axis of said drive element, said backstay having a second portion for rotatably engaging a second portion of said device to be propped, said platform having at least a first bracket mounted thereon, a first portion of a device to be propped slidably engaging said first bracket, said rotating said drive element about its longitudinal axis causing said carriage to move in a direction substantially along said longitudinal axis due to said threaded engagement, thereby causing said first portion of said backstay to move relative to said bracket, thereby causing said second portion of said backstay to move relative to said bracket.

30. A method as recited in claim 29, further comprising rotating said platform relative to a platform mounting portion of a support on which said platform is mounting, thereby causing said device to rotate.

31. A method as recited in claim 30, further comprising forcing fluid through a duct extending from said support through said platform mounting portion and into an enclosed space within said platform.

32. A method as recited in claim 31, further comprising forcing said fluid through at least one centrifugal separator before passing through said duct.

* * * * *